US008838282B1

(12) United States Patent
Ratliff et al.

(10) Patent No.: US 8,838,282 B1
(45) Date of Patent: Sep. 16, 2014

(54) METHOD AND SYSTEM FOR PROVIDING A CENTRAL CONTROLLER THAT CAN COMMUNICATE ACROSS HETEROGENOUS NETWORKS FOR REACHING VARIOUS ENERGY LOAD CONTROL DEVICES

(75) Inventors: Michael Ratliff, Norcross, GA (US); Arthur Vos, Norcross, GA (US); John Mani, Norcross, GA (US)

(73) Assignee: Comverge, Inc., Norcross, GA (US)

( * ) Notice: Subject to any disclaimer, the term of this patent is extended or adjusted under 35 U.S.C. 154(b) by 426 days.

(21) Appl. No.: 12/619,674

(22) Filed: Nov. 16, 2009

(51) Int. Cl.
*G05D 3/12* (2006.01)
*G06F 15/16* (2006.01)
*G06F 3/00* (2006.01)

(52) U.S. Cl.
USPC ............. 700/295; 700/19; 700/286; 709/201; 715/700

(58) Field of Classification Search
USPC ........ 700/19–20, 22, 286, 295; 709/201, 218, 709/223, 230; 715/215, 700
See application file for complete search history.

(56) References Cited

U.S. PATENT DOCUMENTS

| | | | | |
|---|---|---|---|---|
| 6,499,021 | B1 * | 12/2002 | Abu-Hakima | 706/10 |
| 6,519,509 | B1 * | 2/2003 | Nierlich et al. | 700/286 |
| 6,624,532 | B1 * | 9/2003 | Davidow et al. | 307/39 |
| 6,681,154 | B2 | 1/2004 | Nierlich et al. | |
| 6,718,213 | B1 | 4/2004 | Enberg | |
| 7,289,887 | B2 | 10/2007 | Rodgers | |
| 7,580,938 | B1 * | 8/2009 | Pai et al. | 1/1 |
| 2003/0036822 | A1 | 2/2003 | Davis et al. | |
| 2004/0174071 | A1 * | 9/2004 | Nierlich et al. | 307/11 |
| 2006/0025891 | A1 * | 2/2006 | Budike | 700/275 |
| 2006/0184288 | A1 | 8/2006 | Rodgers | |
| 2007/0283001 | A1 * | 12/2007 | Spiess et al. | 709/224 |
| 2008/0159307 | A1 * | 7/2008 | Roe et al. | 370/401 |
| 2008/0172312 | A1 | 7/2008 | Synesiou et al. | |
| 2009/0031241 | A1 * | 1/2009 | Castelli et al. | 715/772 |
| 2009/0138100 | A1 * | 5/2009 | Khorramshahi | 700/22 |
| 2009/0157529 | A1 * | 6/2009 | Ehlers et al. | 705/26 |
| 2009/0326726 | A1 * | 12/2009 | Ippolito et al. | 700/291 |
| 2010/0036541 | A1 * | 2/2010 | Burkmier et al. | 700/297 |
| 2010/0060079 | A1 * | 3/2010 | MacLellan et al. | 307/35 |
| 2010/0100250 | A1 * | 4/2010 | Budhraja et al. | 700/291 |
| 2010/0179707 | A1 * | 7/2010 | Cannon et al. | 700/295 |
| 2010/0187219 | A1 * | 7/2010 | Besore et al. | 219/494 |
| 2010/0217450 | A1 * | 8/2010 | Beal et al. | 700/291 |
| 2010/0217642 | A1 * | 8/2010 | Crubtree et al. | 705/8 |
| 2010/0305772 | A1 * | 12/2010 | Rodgers | 700/295 |
| 2011/0004513 | A1 * | 1/2011 | Hoffberg | 705/14.1 |
| 2011/0029148 | A1 * | 2/2011 | Yang et al. | 700/297 |
| 2011/0066330 | A1 * | 3/2011 | Kim | 701/42 |

(Continued)

*Primary Examiner* — Darrin Dunn
(74) *Attorney, Agent, or Firm* — Smith Risley; Steven P. Wigmore

(57) ABSTRACT

A method and system provides a central controller that can communicate across different types of networks to reach various energy load control devices. Energy load control devices can include, but are not limited to, thermostats, load control switches such as Digital Control Units (DCUs), and gateways or network interfaces coupled to the Internet, etc. This ability to communicate across different types of networks allows the central controller to monitor as well as issue command signals to the various energy load control devices. The central controller can provide geographic maps on displays, such as a computer display, which list the relative locations of energy load control devices with respect to their geography or physical locations. The central controller can also provide a topology that can be customized so that a user can visualize and select groups of energy load control devices according to the user's customized topology.

23 Claims, 15 Drawing Sheets

(56) References Cited

U.S. PATENT DOCUMENTS

2011/0106321 A1* 5/2011 Cherian et al. ............... 700/286
2011/0106328 A1* 5/2011 Zhou et al. ................... 700/291
2011/0270550 A1* 11/2011 Kreiss et al. ................... 702/60
2012/0072142 A1* 3/2012 Keefe et al. ..................... 702/60

* cited by examiner

METHOD AND SYSTEM FOR PROVIDING A CENTRAL CONTROLLER THAT CAN COMMUNICATE ACROSS HETEROGENOUS NETWORKS FOR REACHING VARIOUS ENERGY LOAD CONTROL DEVICES

FIELD OF THE INVENTION

The invention generally relates to software for managing energy loads. More particularly, the invention relates to software of a computer system for communicating control signals across a wide variety of energy management computer networks to a plurality of energy load control devices.

BACKGROUND

Conventional energy management networks can include load management software which may access a large database. The large database can store the identity and locations of numerous energy load control devices, such as thermostats, switches, or any other type of device, whether imbedded or stand-alone, that has the ability of reducing energy consumption, that may be used to turn off and turn on loads, like air-conditioners, during peak energy demands. The load management software can include programs which send out messages to energy control devices at scheduled times from a paging transmitter.

Usually, the communications protocols that are used to transmit the messages from the paging transmitter are proprietary and are not public. To insure the paging transmitter and devices are compatible and will know how to communicate with one another, the paging transmitter and energy load control devices usually must be made by the same manufacturer.

One problem with the conventional energy management network is when communication is desired between an energy load control device made by a first manufacturer on a first network having a first communications protocol and a energy load control device made by a second manufacturer on a second network having a second communications protocol. Another problem exists when communication is desired among energy load control devices that communicate using paging networks and energy load control devices that communicate using broad band networks, such as the Internet and the advanced metering infrastructure (AMI).

One problem associated with trying to communicate energy control messages across two different networks, like a broadband one and a proprietary one, is that each respective network may have its own set of unique latencies (network delays). Latencies are associated with the amount of time that may be needed to transmit a message across a network to a particular energy load control device. Another problem associated with communicating messages over different networks can exist in the intrinsic nature of each respective network's design.

For example, in numerous paging networks, each energy load control device which is part of the paging network usually receives all messages produced by the paging network. Each device within the paging network then determines if the received message was intended for that particular device.

Meanwhile, in a broadband network, messages are created for specific devices. In other words, messages are only received by those devices for which a particular message is addressed. In such broadband networks, each message may be uniquely made or destined for a single energy load control device. This means that only one message may be needed for a paging network while numerous messages are needed in a broadband network in which individual messages are addressed to individual devices, opposite to the paging network.

Another complexity associated with broadband networks is that there can be more than one communication protocol associated with the network. This means that messages may require propagation within a network according to two or more different communication protocols. Each communication protocol can have its own set of unique steps and/or methodology.

Another problem associated with communicating across different networks is that each network may have different bandwidths with respect to volume of messages that a particular network can handle. For example, in a paging network, messages may be required to be sent in a serial fashion and with gaps of time between messages. Meanwhile, broadband networks may be able to handle "shotgun" blasts of multiple messages sent to it and across the network, in parallel or at the same time.

Another problem that exists is that conventional load management systems are usually designed to handle either residential loads or industrial loads, and not both. There has not been a successful system which has been introduced that can manage both residential energy loads as well as industrial energy loads. Another problem that exists is the ability for a energy producer or energy seller to monitor the status of various energy load control devices that may be part of different networks because each energy load control device may be made from a different manufacturer. An energy producer or energy seller usually must monitor separate systems for energy load control devices that reside across different communications networks.

A further problem exists in the art in sending control messages to various energy load control devices. Many conventional systems require energy control strategies to be developed on the fly by one or more human operators. Human operators are also responsible for determining the appropriate number and type of messages to send across a network to reach one or more energy load control devices.

Another problem that exists in the art is the ability to see the relative geographical locations of various energy load control devices that may be part of a network that is managed by an energy producer or energy seller. Often, conventional systems may provide a network view of the various energy load control devices that may be part of a network, however, the conventional systems do not provide physical or geographical locations with respect to energy load control devices that are part of the network.

Accordingly, there is a need in the art for a method and system central system that communicates across different types of networks to reach various energy load control devices. There is a further need in the art for a central system that can be used to monitor as well as control various energy load control devices that exist in different networks. A further need exists in the art for a central system that can provide physical or geographical location data for energy load control devices that may reside across different networks. Another need in the art exists for a method and system that can provide energy control strategies that can be selected from predetermined templates. A further need exists in the art for a method and system that can provide control for both residential and industrial/commercial customers. And lastly, an additional need exists in the art for a method and system which can provide a user interface which is simple yet comprehensive in the control of various energy load control devices that reside across different networks.

SUMMARY

A method and system provides a central controller that can communicate across different types of networks to reach various energy load control devices. An energy load control device can include, but is not limited to, thermostats, load control switches such as Digital Control Units (DCUs), gateways or network interfaces coupled to the Internet, etc., or other embedded or stand-alone devices that have the ability to curtail energy consumption through reducing or shutting off the energy usage or monitor energy consumption of any certain type of energy consuming device, energy routing device, or energy producing device, which can include, but is not limited to, appliances, HVAC systems, water heaters, pool pumps, electric or partially electric automobiles, transformers, solar panels, wind turbines, geothermal facilities, hydro-facilities, etc.

This ability to communicate across different types of networks allows the central controller to monitor as well as issue command signals to the various energy load control devices that reside in the different types of networks. The central controller can also provide physical or geographical location data for energy load control devices that may reside across different networks.

Specifically, the central controller can provide geographic maps on displays, such as a computer display, which list the relative locations of energy load control devices with respect to their geography or physical location relative to each other. The central controller can also provide a topology that can be customized so that a user can visualize and select groups of energy load control devices according to a user's customized topology.

The method and system provides a central controller that can provide energy control strategies that can be selected from predetermined templates. Specifically, the central controller can provide a list of several energy control strategies in the form of graphs. These graphs can be plots of energy reduction versus time.

The method and system can provide a central controller which can manage both residential and industrial/commercial customers at the same time. The central controller can monitor both residential and commercial customers. The method and system can provide a user interface on a computer display which is simple yet comprehensive in the control of various energy load control devices that reside across different networks. The method and system can allow a user to control various energy load control devices without requiring the user to know how to communicate directly with the various energy load control devices.

According to one exemplary aspect, a computer method for communicating with an energy load control device can comprise identifying a relative position of an energy load control device within a topology. Next, a list of energy load control strategies available for the energy load control device can be displayed. A selection of an energy load control strategy can then be received. One or more messages that correspond with the selected energy load control strategy and which are based on characteristics of the energy load control device can be generated. The one or more messages can be sent to the energy load control device in order to implement the selected energy load control strategy.

According to another exemplary aspect, a computer method for communicating with energy load control devices residing in different networks can comprise identifying relative position of each energy load control device of a plurality of energy load control devices within a topology and based upon a corresponding network in which each energy load control device resides. Nodes within the topology that comprise the energy load control devices which reside in different networks can be displayed. A selection of nodes within the topology can be displayed. A list of energy load control strategies available for the selected nodes can be displayed.

According to another aspect, a computer system for communicating with energy load control devices residing in different networks can comprise a processing unit; a memory storage device; a display device coupled to the processing unit for displaying data; and a program module. The program module provides instructions to the processing unit. The processing unit, which is responsive to the instructions of the program module, may be operable for displaying nodes within a topology that comprise the energy load control devices. Relative locations of the selected nodes are displayed on a geographic map. A selection of nodes within the topology can be received. And a list of energy load control strategies available for the selected nodes can be displayed.

BRIEF DESCRIPTION OF THE DRAWINGS

FIG. 13B illustrates sample batch file data for an energy load control device according to an exemplary embodiment of the invention.

DETAILED DESCRIPTION

Figure 1:
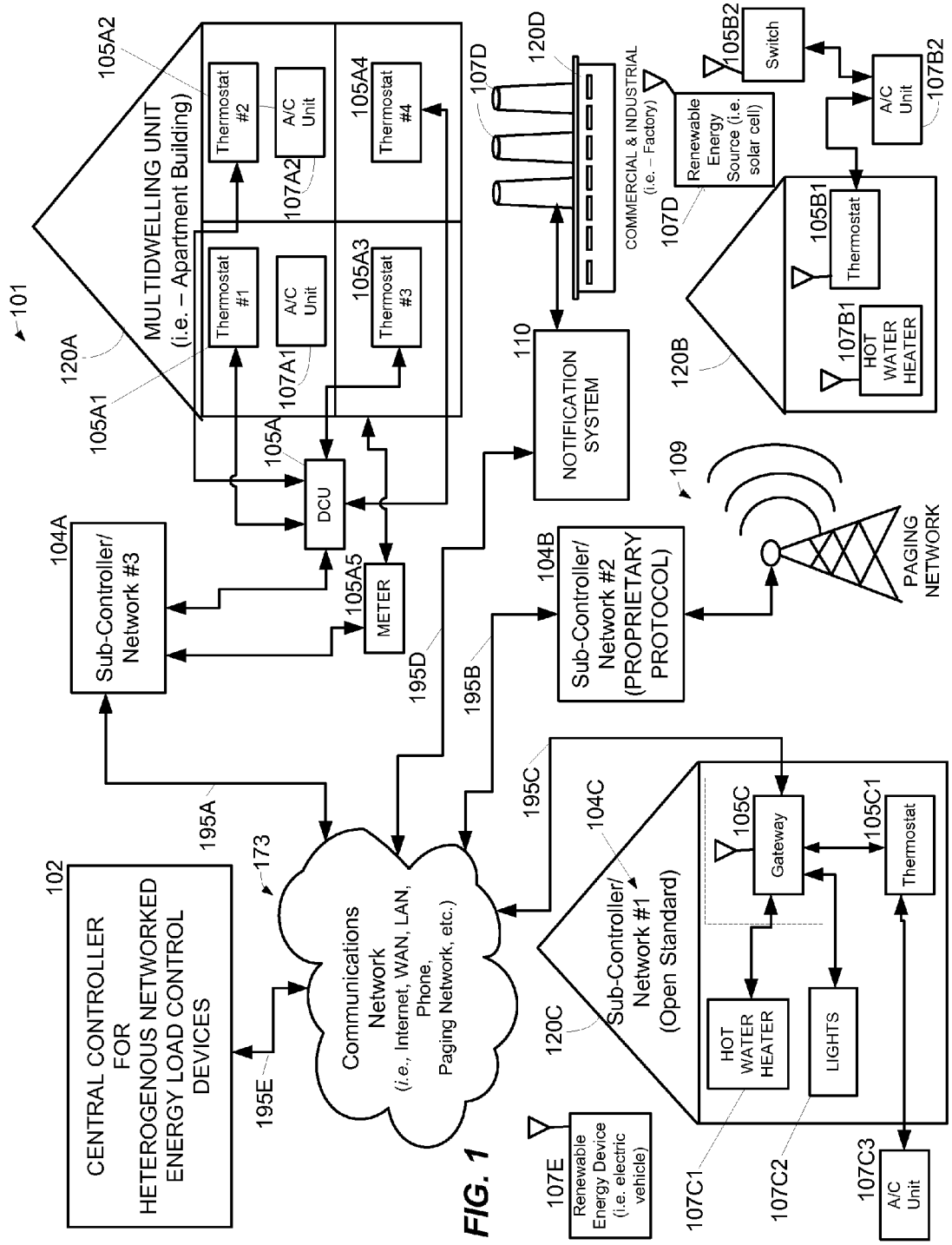
FIG. 1 is a functional block diagram of a system that can communicate across different types of networks to reach various energy load control devices according to an exemplary embodiment of the invention.

Referring now to the Figures, in which like reference numerals denote like elements, FIG. 1 is a functional block diagram of an energy control system 101 that can communicate across different types of networks 173, 104A-104C to reach various energy load control devices 105 according to an exemplary embodiment of the invention.

The system 101 can comprise a central controller 102 that can communicate with heterogeneous networked energy load control devices 105. The energy load control devices 105 can include, but are not limited to, thermostats 105A1-A4, 105B1, 105C1, load control switches 105B2, Digital Control Units (DCUs) 105A, gateways or network interfaces 105C coupled to the Internet, etc., and various other devices which may turn on AND/OR turn off or relay messages that cause rate reductions or increases in various types of load assets 107. The energy load control devices 105 can be housed within a building 120. The building 120A can comprise a multi-dwelling unit such as an apartment building that has several different residences under a single roof. However other buildings 120B, 120C may comprise a single residences or single-family homes. The buildings 120D may also comprise commercial and business structures.

The load assets 107 can comprise any type of energy consuming device such as, but not limited to, appliances, industrial machinery 107D, and other like assets 107. Appliances can include, but are not limited to, stoves, dish washers, dryers, hot water heaters 107C1, refrigerators, lights 107C2, furnaces, air conditioners 107A1-A2, 107B2, and 107C3, and other like energy consuming appliances. The load assets 107 can also include other devices that may be associated with renewable energy sources. For example, the load assets 107 can comprise solar cells 107D, wind mills, hydroelectric power sources, geothermal power sources, and energy storage units related to these renewable energy sources, such as electric batteries. While these type of load assets 107D may be actually producing energy instead of consuming energy directly, they may be controlled like a load asset in that the system 101 can turn the assets on or off or adjust/manage their output levels, depending upon energy demands.

The load assets 107E can include renewable energy devices such as electric vehicles. In the exemplary electric vehicle scenario, while the load asset may comprise the battery or other energy storage unit of the electric vehicle, the energy load control device 105 can comprise any circuitry that controls how energy is loaded into or taken from the energy storage unit of the electric vehicle. One of ordinary skill in the art will appreciate that the energy load control device 105 comprising the circuitry for controlling re-charging/discharging of the electric vehicle could reside in a charger separate from the vehicle or the control circuitry could reside within the vehicle itself. That is, one of ordinary skill in the art recognizes that the energy load control device 105 can be integral or embedded within a particular load asset 107E, such as control circuitry for managing power of a load asset 107, that may include, but is not limited to, an electric vehicle 107E.

In other exemplary embodiments, a load asset 107 could comprise one or more elements of an electric power grid. For example, a load asset 107 could comprise a transformer that is coupled to one or more customers, such as residential homes or businesses housed in different buildings or the same building. These customers may each have an electric vehicle. In such a scenario, the energy load control device 105 could comprise circuitry adjacent to or within the transformer 107 of the electric power grid that manages and monitors the power handled by the transformer 107. With these examples, it is apparent to one of ordinary skill in the art that the number and type of energy load control devices 105 and load assets 107 that can be controlled are limitless and are within the scope of the invention.

While according to a preferred exemplary embodiment the load assets 107 are typically electrical in nature, other types of load assets for different energy sources besides electricity are included within the scope of the invention. For example, other energy sources can include, but are not limited to, natural gas, oil, steam, and the like.

Figure 2:
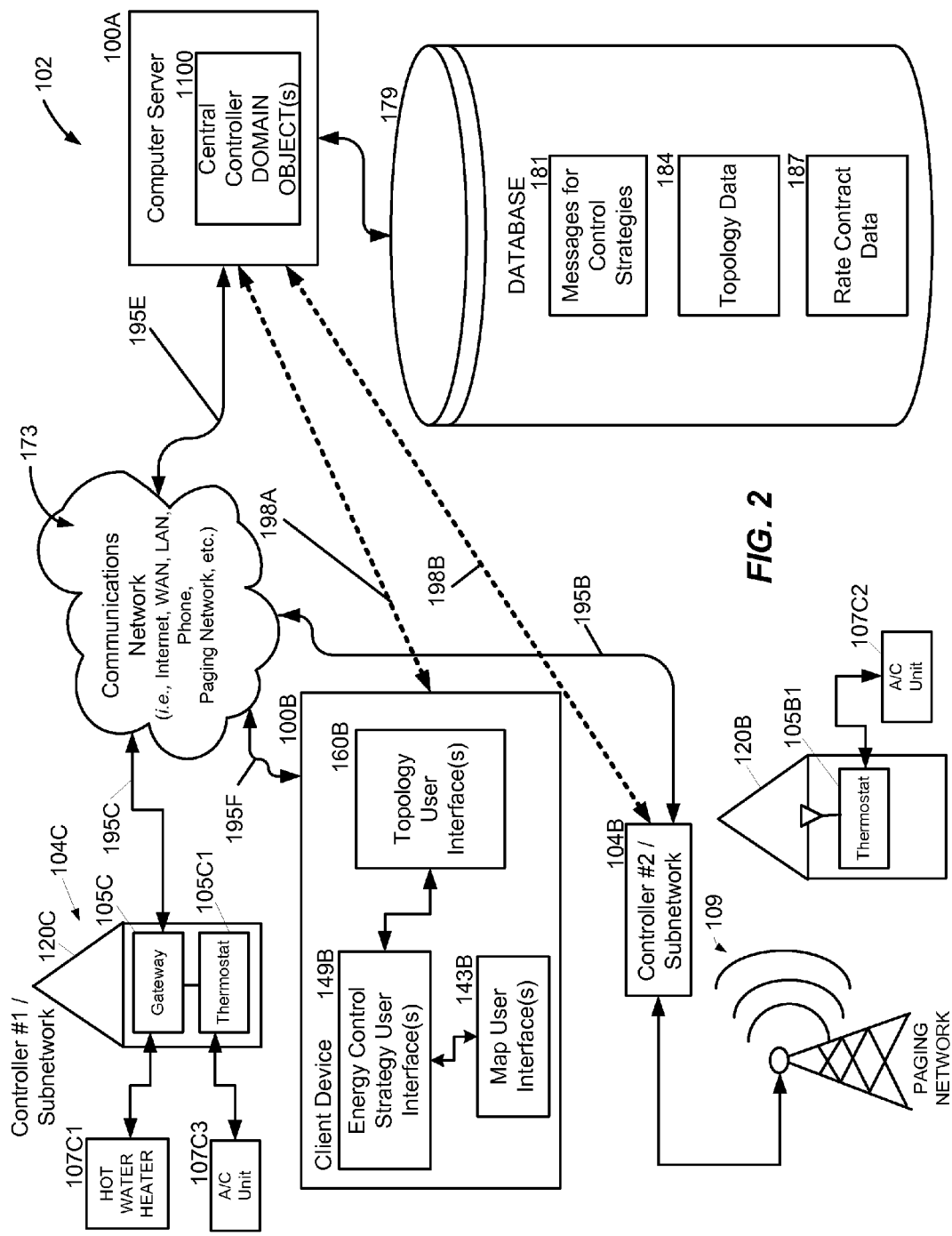
FIG. 2 is another functional block diagram of the system of FIG. 1, but with an expanded view of the elements which form the central controller of FIG. 1 according to an exemplary embodiment of the invention.

The central controller 102 can comprise a computer system that includes a computer server 100A and a database 179 which are illustrated in FIG. 2 and described in further detail below. The central controller 102 can be coupled to a communications network 173 via a link 195E. The links 195 illustrated in FIG. 1 can be wired or wireless links. Wireless links include, but are not limited to, radio-frequency links, infrared links, acoustic links, and other wireless mediums. The communications network 173 can comprise a wide area network ("WAN"), a local area network ("LAN"), the Internet, Public Switched Telephony Network (PSTN), a paging network, or a combination thereof.

The central controller 102 can communicate with the various energy load control devices 105 through the communications network 173 that may be coupled to the various other sub-controllers/networks 104 and a notification system 110. The sub-controllers/networks 104 may comprise hardware and/or software that are responsible for communications with various energy load control devices 105 that are coupled to a respective sub-controller 104.

For example, the first sub-controller/network 104C may comprise one that uses an open standard protocol for communications with its energy load control devices 105C as well as its three load assets 107C1-C3. One open standard protocol as of this writing is the IEEE 802.15.4-2006 standard which specifies the physical layer and media access control for low-rate wireless personal area networks (LR-WPANs). This standard may be used as the basis for the ZigBee, WirelessHART, and MiWi specifications.

Meanwhile, a second sub-controller/network 104B may comprise a portion of a paging network 109. The paging network 109 may operate according to a proprietary, non-standard protocol for communicating with energy load control devices 105. The energy load control devices 105, such as thermostat 105B1, may be manufactured specifically for the paging network 109 and may not operate on any other network such as the third sub-controller/network 104A.

Similarly, the energy load control devices 105A1-A5, 105A coupled to the third sub-controller/network 104A, such as the digital control unit 105A and thermostats 105A1-A4 and meters 105A5 may not operate on or within any other network such as the second sub-controller/network 104B, as discussed above. That is, energy load control devices 105 of a first network 104C manufactured by a first manufacturer may be incompatible with a second network 104B manufactured by a second manufacturer. The third sub-controller/network 104A may be part of a standard system such as the advanced metering infrastructure (AMI) system. One of ordinary skill in the art recognizes that AMI systems measure, collect and analyze energy usage, from advanced devices such as electricity meters, gas meters, and/or water meters, through various communication media on request or on a pre-defined schedule. This infrastructure includes hardware, software, communications, customer associated systems and meter data management (MDM) software.

The discussion of open standard protocols, AMI systems, and paging networks 109 are only examples of different types of networks and systems which can be supported by the central controller 102. Other open standard protocols, metering systems, and paging networks which have not been described are within the scope of the invention.

The central controller 102 may also be coupled to a notification system 110. The notification system 110 may be treated by the central control 102 as an energy load control device 105 in that the central controller 102 may send messages to the notification system 110 that are similar to those sent to typical energy load control devices 105. The reason why the notification system 110 may be different relative to the other energy load control devices 105 is that the notification system 110 is coupled to commercial and industrial type loads or assets 107D.

Commercial and industrial type loads or assets 107D may include, but are not limited to, power generation for a manufacturing facility, woodworking machinery, metal working machinery, textile machinery, and any type of production line machinery, and other like industrial loads. The notification system 110 may be one which only relays suggested control signals or suggested pricing signals generated by the central controller 102 and sent to an operator who has the capability to control energy destined for one or more commercial and/or industrial type loads 107D. However, it is not beyond the scope of the invention for some commercial and industrial type loads or assets 107D to receive control signals directly from the central controller 102.

With the central controller 102, various energy load control devices 105 across different sub-controllers/networks 104 can be controlled and monitored. The central controller 102 can issue control signals according to the communication protocols that may be unique for a particular sub-controller/network 104. The central controller 102 can also receive performance data from the various energy load control devices 105 that can be displayed to a user.

For example, if an energy producer or energy reseller was responsible for the air-conditioning units 107A1-A2 of the multidwelling unit 120A in the third sub-controller/network 104A as well as the air-conditioning unit 107C3 of the first sub-controller/network 104C, the central controller 102 would allow the energy producer or energy reseller to implement energy control strategies that are identical to one another across the two different networks 104A,C.

In addition to issuing commands to the various sub-controllers/networks 104 that are responsible for residential energy use, the central controller 102 can send suggested control strategies or signals to the notification system 110 that is responsible for commercial and industrial type load assets 107D. In this way, the central controller 102 can be used to provide consistent and/or identical energy control strategies across both residential platforms 104 and commercial and industrial platforms.

FIG. 2 is another functional block diagram of the system 101 of FIG. 1, but with an expanded view of the elements which form the central controller 102 of FIG. 1 according to an exemplary embodiment of the invention. The central controller 102 can comprise a three-tier computer architecture that includes a client device 1008, a computer server 100A, and a database 179. FIG. 2 shares many elements which are common to those found in FIG. 1. Therefore, only the differences between these two Figures will be described in detail below.

Each client device 100B can run or execute web browsing software in order to access the server 100A and its various applications, such as a map user interface domain object 143B, control strategy user interface domain object 149B, and topology user interface domain object 160B.

One of ordinary skill in the art recognizes that an "object," in the domain of object-oriented programming, usually means a compilation of attributes (object elements) and behaviors (methods) encapsulating an entity. The term "object" may be used interchangeably in this specification with the term "module." It is recognized that "objects," at the time of this writing, are the foundation of object-oriented programming, and are fundamental data types in object-oriented programming languages. Object-oriented languages can provide extensive syntactic and semantic support for object handling, including a hierarchical type system, special notation for declaring and calling methods, and facilities for hiding selected fields from client programs. However, one of ordinary skill in the art recognizes that objects and object-oriented programming can be implemented in any language.

The map user interface domain object 143B can provide a geographic map that lists energy load control devices 105 that may exist within a particular geographic area displayed on the map. The control strategy user interface domain object 149B displays a listing of various predetermined control strategy templates that can be selected by a user for sending control messages to various energy load control devices 105 across different networks. The topology user interface domain object 160 displays various groupings of energy load control devices 105 that can be selected by a user. These domain objects 143B, 149B, 160B that form part of the central controller 102 will be described in further detail below.

The client device 100B can take on many different forms such as desktop computers, laptop computers, handheld devices such as personal digital assistants ("PDAs"), in addition to other smart devices such as cellular telephones. Any device which can access the network 173 can be a client computer device 100B according to the system 101. The client device 100B can be coupled to the network 173 by various types of communication links 195. These communication links 195 can comprise wired as well as wireless links, as discussed above. The communication links 195 allow the client device 1008 to establish a virtual links 198A with the server 100A.

The server 100A can comprise any type of computer server. For example, the server 100A can comprise a Linux based operating system and can process pages produced by the Ruby on Rails framework. Ruby on Rails (RoR) is written and ran under libraries written in the Ruby API. RoR is an open source web application framework for the Ruby programming language. It can be used with an Agile development methodology which is used by web developers for rapid development. The Ruby on Rails Framework provides an object relational mapping (ORM) library that can be used with the database 179. As an alternative to using Linux and RoR, the server 100A can comprise a Java Platform, Enterprise Edition. Other exemplary server application specifications, include, but are not limited to the following: RedHat Enterprise Linux 5; Apache 2.2; Ruby 1.8; and Ruby On Rails 2.3.3. Other types of server platforms known as of this writing, but not mentioned, are within the scope of the invention.

The server 100A can run or execute various program central controller domain objects 1100 which are described in further detail below in connection with FIG. 11. The central controller domain objects 1100 can support or can include portions of the control strategy user interface domain object 149B, the map user interface domain object 143, and the topology user interface domain object 160B that are accessed by the client device 100B.

The server 100A is coupled to a database 179. The database 179 can comprise a sequential query language (SQL) server. The database 179 can store various information about the energy load control devices 105 and the load assets 107. Specifically, the database 179 can store the messages 181 for control strategies, the topology data 184 for various groups of energy load control devices 105, as well as rate contract data 181 for each energy load control device 105. Further details about the messages 181, topology data 184, and rate contract data 181 will be provided below. Other hardware and software for the computer server 100A and server 179, other than those described, are not beyond the scope of the invention.

With the client device 100B, various energy load control devices 105 that reside across different networks, such as in a first sub controller/network 104C and in a second sub-controller/network 104B, can be controlled. That is, the client device 100B can communicate with the computer server 100A across the communications network 173. After receiving commands from the client device 100B, the computer server 100A can send messages to the energy load control devices 105C of the first sub-controller/network 104C and messages to the energy load control devices 105B1 of the second sub-controller/network 104B so that both sets of energy load control devices 105 across two different networks 104 can implement the same control strategy. The computer server 100A can receive performance data from each of the energy load control device 105 and their respective networks 104. The computer server 100A can display this performance data through the client device 100B that is executing the map user interface domain object 143.

Figure 3:
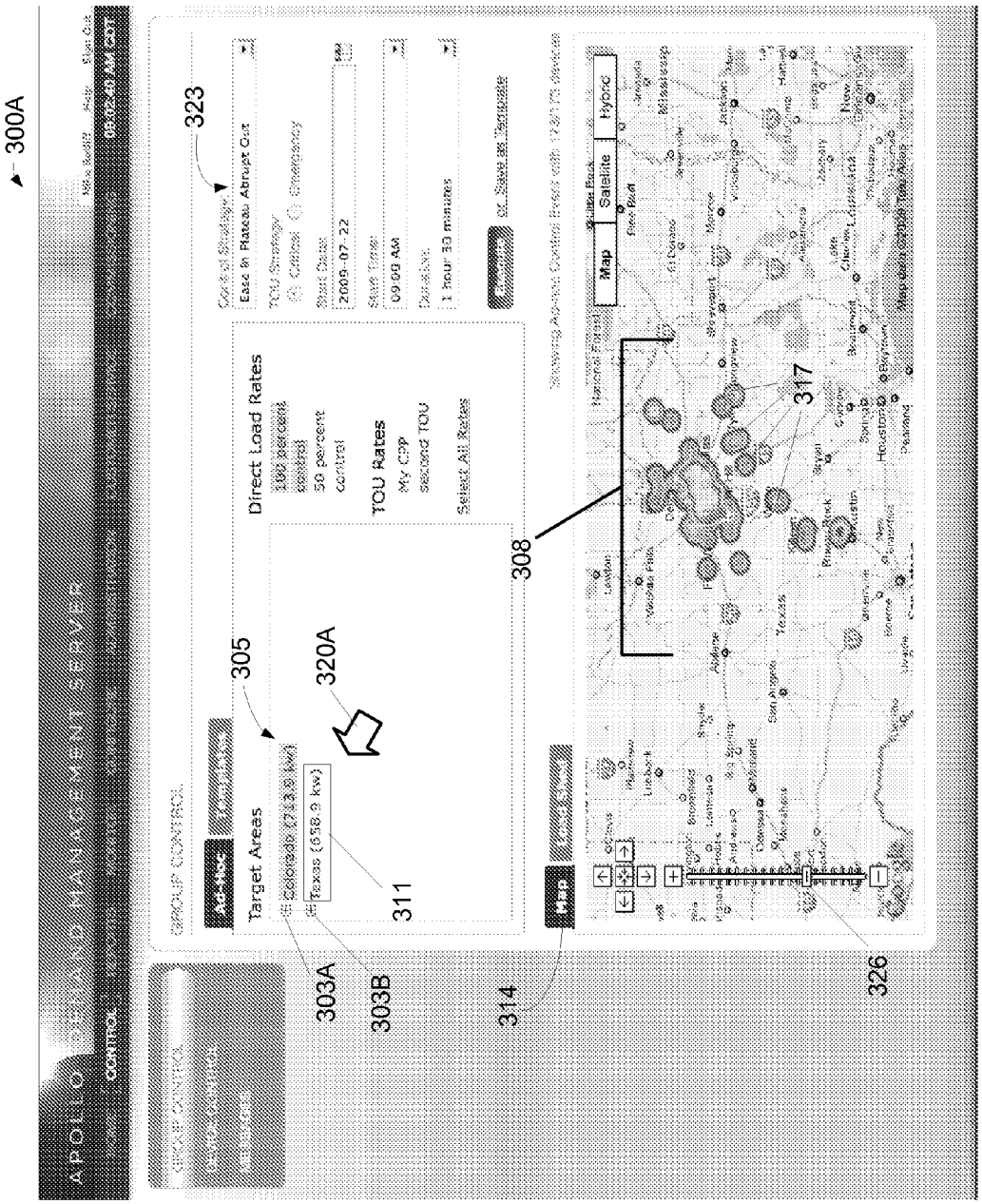
FIG. 3 is an exemplary computer display of a graphical user interface which provides selectable topology data and selectable geographic map data according to an exemplary embodiment of the invention.

FIG. 3 is an exemplary computer display 300A of a graphical user interface which provides selectable topology data 305 and selectable geographic map data 308 according to an exemplary embodiment of the invention. In the exemplary embodiment illustrated in FIG. 3, the topology data 305 comprises a hierarchical arrangement of the energy load control devices based on geography. That is, the selectable topology data 305 has been organized such that energy load control devices 105 are organized into groupings based on their geographical location. The topology data 305 can comprise specific physical, i.e., real, or logical, i.e., virtual, arrangement of energy load control devices 105 across one or more networks.

A node 303 within the topology data 305 can comprise a branch or intersection or a grouping of several different energy load control devices 105. Nodes 303 can be parts of various levels within a given topology. Depending on a level for a certain node 303, the node 303 can be expanded into further sub-nodes or sub-levels for a given topology.

Figure 4:
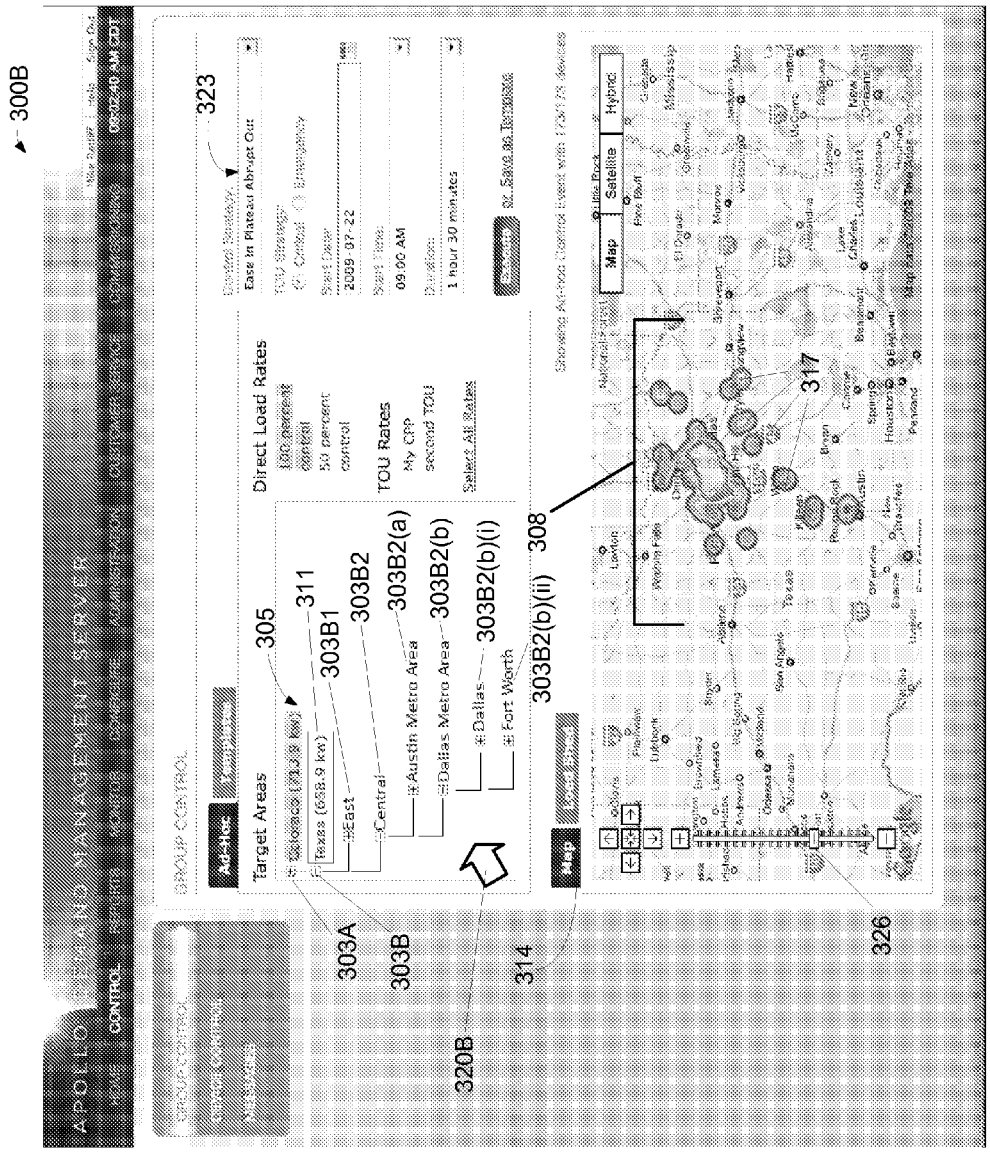
FIG. 4 is an exemplary computer display of a graphical user interface corresponding to the one illustrated in FIG. 3 in which a selected topology has been expanded according to an exemplary embodiment of the invention.

For example, in the computer display 300A of FIG. 3, the first level or first layer nodes or highest order level nodes 303 in the topology data 305 based on geography are the states of Colorado 303A and Texas 303B. Each of these nodes 303A, 303B can be further expanded when a user selects the "plus" sign symbol for a particular node 303. This means that when a particular state node 303 is selected such as the state node 303B of Texas in the example illustrated in FIG. 3 which has been highlighted with a rectangular box 311 to denote the selection, lower order nodes 303B1, B2 may be displayed, such as illustrated in FIG. 4 and described in further detail below.

While the example illustrated in FIG. 3 depicts energy load control devices 105 in a topology organized by geography, one of ordinary skill in the art recognizes that the energy load control devices 105 can be organized into other groupings or hierarchies based on the other types of relationships or characteristics of the energy load control devices 105. For example, the energy load control devices 105 could be organized into groups based on relative sizes of energy loads being managed. Other types of topologies are described in further detail below in connection with FIG. 5.

Because the node of Texas 303B has been selected as indicated by the rectangular box 311, the map user interface domain object 143 can display a map 314 which lists or identifies the relative locations 317 of energy load control devices 105 within the state of Texas that are managed by the central controller 102. The map 314 can be interactive in that a user can use a screen pointer 320A to select energy load control devices 105 that may be of a particular interest to the user. When the user selects one or more locations 317 of energy load control devices 105 on the map 314, further details of the selected energy load control devices 105 can be displayed within the computer display 300A, such as an update to the topology data 305 that can indicate the relative location of a selected energy load control device 105 within the topology data 305.

Further, the map user interface domain object 143 could provide a zoomed-in update to the map 314 by increasing a magnification of the location for the one or more selected energy load control devices 105 on the map 314. Alternatively, depending upon the number and relative location of energy load control devices 105 selected, the map user interface domain object 143 could provide a zoomed-out update to the map 314 by decreasing a magnification of the location for the selected energy load control devices 105 on the map 314. Further, the screen pointer 320A could be used to select a map zooming level control 326 which can be used to adjust the relative magnifications of the map 314 being displayed by the map user interface domain object 143.

The computer display 300A may further comprise selectable menus 323 for allowing a user to select one or more energy control strategies for the nodes 303 which have been selected. Further details of the energy control strategies will be discussed below in connection with FIG. 7.

FIG. 4 is an exemplary computer display 300B of a graphical user interface corresponding to the one illustrated in FIG. 3 in which selectable topology data 305 has been expanded according to an exemplary embodiment of the invention. FIG. 4 shares many elements which are common to those found in FIG. 3. Therefore, only the differences between these two Figures will be described in detail below.

In the exemplary embodiment illustrated in FIG. 4, the first order node 303B comprising the state of Texas has been expanded in response to a selection of the "plus" sign symbol which was adjacent to the second order node 303B. Once the "plus" sign symbol was selected, it was replaced with a "minus" sign symbol to indicate that the second order node 303B has been expanded and can now be collapsed if the "minus" sign symbol was selected.

The first order node 303B comprising the state of Texas has at least two lower order or lower level nodes 303B1 and 303B2. The first of the second lower order node 303B1 comprises a geographic designation referred to as "East." The second of the second lower order node 303B2 comprises a geographic designation referred to as "Central." One of ordinary skill in the art recognizes that any number of nodes 303, other than the lowest order node level, can be assigned to any particular order or level within the topology 305.

In the exemplary embodiment illustrated in FIG. 4, the second order node 303B2 comprising the geographic designation of "Central" has been expanded by the user. This second order node 303B2 has two lower order or lower level nodes 303B2(a) and 303B2(b) that comprise the Austin metropolitan area and the Dallas metropolitan area.

Figure 5:
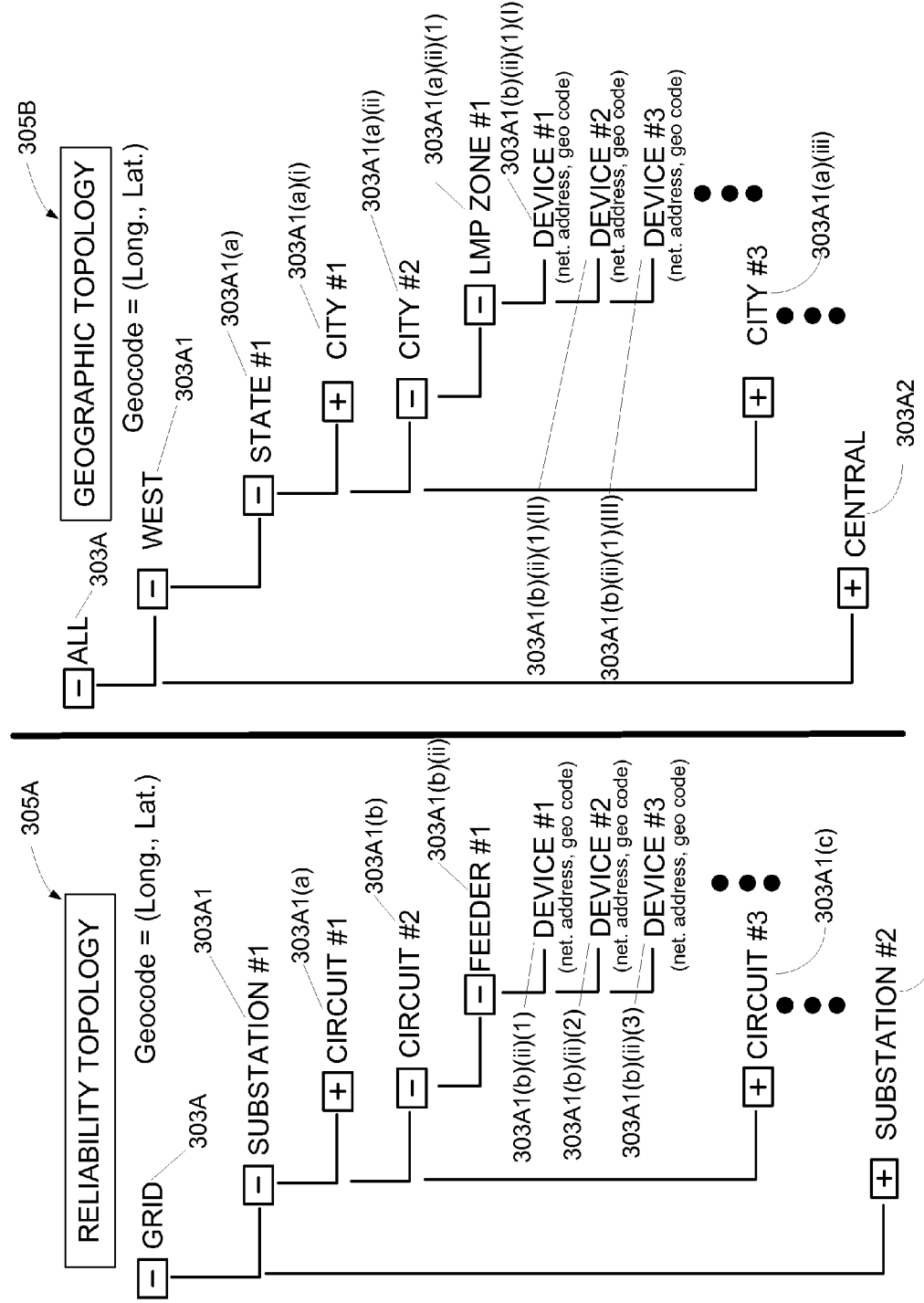
FIG. 5 illustrates at least two examples of different topologies that can be used with the central controller according to an exemplary embodiment of the invention.

Similarly, in the exemplary embodiment illustrated in FIG. 4, the third order node 303B2(b) comprising the geographic designation of the Dallas metropolitan area has also been expanded into two additional lower order or lower level nodes 303B2(b)(i) and 303B2(b)(ii) that comprise the cities of Dallas and Fort Worth Tex. The "plus" sign symbols adjacent to these fourth order nodes 303B2(b)(i) and 303B2(ii)(2) indicates that these nodes can also be expanded. One of ordinary skill in the art recognizes that the lowest order nodes 303 will generally comprise the load assets 107 and the order node just above the lowest order nodes 303 will generally comprise the energy load control devices 105. FIG. 5 discussed in further detail below illustrates exemplary lowest order nodes 303.

If a user were to select a particular node 303 with the screen pointer and 320B, then the corresponding energy load control devices 105 can be highlighted with the map 314. Similar to how the nodes 303 are expanded as described above, the user can also select the "minus" sign symbols adjacent to the nodes 303 in order to collapse the topology 305 for a particular node 303 and its related lower order or lower level nodes 303.

The user interface illustrated in FIG. 4 allows a user to view the geographic locations in which energy load control devices 105 reside and that are in communication with the central controller 102. The user interface of FIG. 4 also allows the user to select specific energy load control devices 105 within a particular geography in order to implement a particular control strategy that may also be selected by the user. The user interface of FIG. 4 provides a powerful tool in that a user can select energy load control devices 105 to implement certain energy control strategies irrespective of the one or more different networks in which a plurality of energy load control devices 105 may reside. While though the energy load control devices 105 may be in physical locations that are proximate to one another, there is still a possibility that energy load control devices reside in at least two different communication networks.

One of ordinary skill in the art recognizes that the computer displays 300A, 300B are mere examples of how information can be presented and organized. That is, one of ordinary skill in the art recognizes that the information presented in the computer displays 300 A, 300B could be arranged in a spatially different manner without departing from the scope of the invention. For example, the map 314 could be positioned in an upper region of the displays 300A, 300B instead of the current lower regions depicted in FIGS. 3 and 4. Similarly, the topology data 305 could be moved to other regions in the displays 300A, 300B without deviating from the invention.

Further, one of ordinary skill the art recognizes that options could be provided for the displays 300A, 300B such that a user could customize these displays to present information in a spatial arrangement that is selected by the user. One of ordinary skill in the art also recognizes that the relative sizes of the different information elements presented on the displays 300A, 300B could be adjusted without going outside the scope of the invention. For example, the window containing the topology data 305 could be expanded or contracted without going outside the invention. Similarly, the window containing the map 314 could also be expanded or contracted without departing from the scope of the invention.

FIG. 5 illustrates at least two examples of different topologies 305A, 305B that can be used with the central controller 102 according to an exemplary embodiment of the invention. FIG. 5 shares many elements which are common to those found in FIGS. 3 and 4. Therefore, only the differences between these two Figures will be described in detail below.

As noted above, topology data 305 can comprise specific physical, i.e., real, or logical, i.e., virtual, arrangement of energy load control devices 105 across one or more networks. A node 303 within the topology data 305 can comprise a branch or intersection or a grouping of several different energy load control devices 105. Nodes 303 can be parts of various levels within a given topology. Depending on a level for a certain node 303, the node 303 can be expanded into further sub-nodes or sub-levels for the given topology 305.

A first exemplary topology 305A can comprise one that is organized according to a reliability model. In other words, energy load control devices 105 can be grouped according to how particular energy load control devices 105 are connected to one another in an electrical grid and how this electrical interconnection can impact failures or faults within a given electrical distribution network. The first order node level 303A can comprise a grid level. The second order node level 303A1 may comprise a substation level. The third order node level 303A1(a) level may comprise a circuit level. The fourth order node level 303A1(b)(i) may comprise a feeder level 303A1(b)(i). And the fifth order node level 303A1(b)(i)(1), which constitutes the lowest order node level of the first topology 305A, may comprise an energy load control device level.

At this lowest level, the energy load control devices 105 are assigned specific network addresses as well as a geocode. The network addresses describe the relative location of an energy load control device 105 within an electronic framework or network. Meanwhile the geocode provides information about the relative geographic location of the energy load control device 105. According to one exemplary embodiment, the geocode may comprise longitude and latitude coordinates expressed in degrees and minutes.

The second topology 305B illustrated in FIG. 5 is based on an geographic model with respect to how an energy producer or an energy reseller may manage its energy load control devices 105. This second topology 305B is similar to that illustrated in the computer displays 300A, 300B of FIGS. 3 and 4. The sixth order node 303A1(a)(ii)(1)(I) of the second topology 305B may be the lowest order node and it may comprise an energy load control device level. At this lowest level, the energy load control devices 105 are assigned specific network addresses as well as a geocode, as noted above with respect to the first exemplary topology 305A.

As noted above, one of ordinary skill in the art recognizes that any number of nodes 303, other than the lowest order node level, can be assigned to any particular order or level within a desired topology 305. Depending on a level for a certain node 303, the node 303 can be expanded into further sub-nodes or sub-levels for a given topology. The topology data 305 can comprise specific physical, i.e., real, or logical, i.e., virtual, arrangement of energy load control devices 105 across one or more networks.

This means that energy load control devices 105 can be organized and grouped in any way that is desired by a particular owner/manager of a group energy load control devices 105. As another example, a franchisor who owns or manages a large group of franchisees may organize energy load control devices according to a corporate organization of the franchisees. For example, certain franchisees can be assigned to particular districts and these particular districts can be assigned to particular nodes 303 within the topology will 305. In view of the reliability example 305A, the geographic example 305B, and the franchisee model, it is apparent to one of ordinary skill in the art that the invention covers any topology 305 that can be created for a given set of energy load control devices 105.

A plurality of topologies 305 can be tracked and maintained for each energy load control device 105. This means that the central controller 102 can allow a user to switch between two or more topologies 305 that may be assigned to each energy load control device 105. In this way, the central controller 102 allows the user to select energy load control devices based on topologies 305 that may be tailored according to how the user manages his or her energy load control devices 105.

Figure 6:
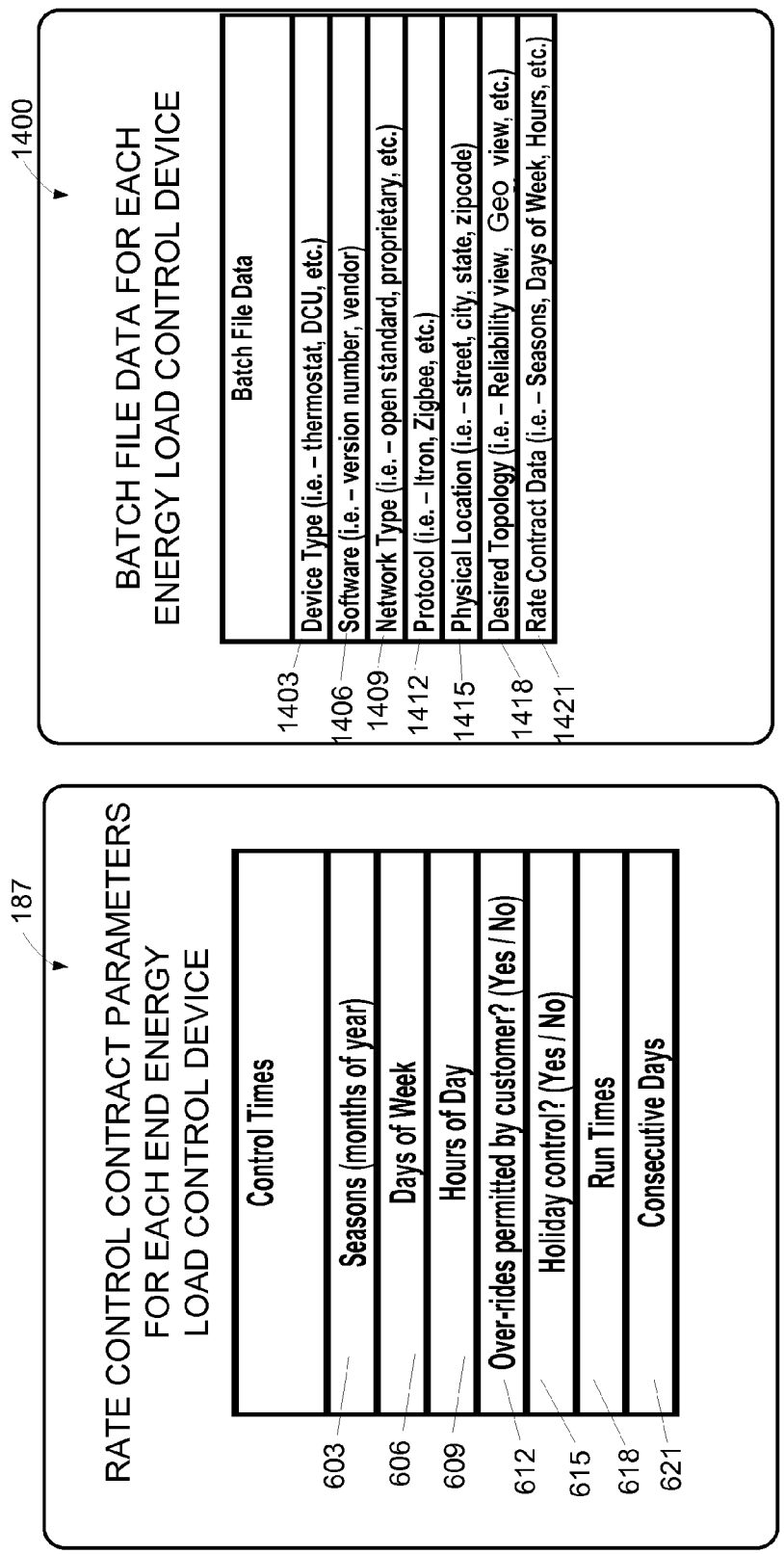
FIG. 6 is a diagram illustrating various rate control contract parameters of energy load control devices according to an exemplary embodiment of the invention.

FIG. 6 is a diagram illustrating various rate control contract parameters 187 assigned to energy load control devices 105 according to an exemplary embodiment of the invention. The management of energy load control devices 105 may be governed according to rate control contracts. In other words, energy customers may have the option of allowing control over their load assets 107 only during specific periods of time. This means that the energy load control devices 105 may only have direct control over their respective load assets 107 during the times permitted under a particular rate control contract.

For example, an energy customer as described under a rate control contract may allow an energy supplier to provide an energy load control device 105, such as an outdoor cycling switch or a programmable thermostat, that allows the energy supplier to control the customer's central air conditioning system during critical peak energy use hours. This control by the energy supplier under the rate control contract can help reduce demand for electricity and achieve the energy supplier's demand reduction goals. The participating energy customers will receive a credit on their bills for participating in such a program. Such a program can be divided into tiers in which each tier of the program (governed by a rate control contract assigned to each customer) provides more control or more time in which an energy supplier can operate a energy load control device 105. The higher tiers of the program which allow more control may also yield higher credits to the customer under a particular rate control contract.

Exemplary rate control contract parameters 181 can include, but are not limited to, control times that comprise seasons 603, days of the week 606, hours of the day 609, overrides permitted by customer 612, holiday control 615, run times 618, and consecutive days 621. The seasons parameter 603 may comprise a listing of the months of the year in which an energy load control device 105 may be operated or have control over a particular load asset 107. The days of the week parameter 606 may indicate certain days within a week in which an energy load control device 105 may have control over a particular load asset 107. Rate control contracts may allow a customer to designate certain days of the week that an energy supplier can control a customer's particular load assets 107. For example, if a customer works during normal business hours (9 AM-5 PM) of Monday through Friday during a week, and the customer will likely opt to allow control of load assets 107 by central controller 102 while the customer is not present in his or her home.

Similarly, for the hours of the day parameter 609, a customer may opt to relinquish any or all control over load assets 107 during the hours that he or she may be at work and away from the load assets 107. A particular rate control contract may also permit over-rides by the customer if the customer elects to stop control over a particular load asset 107 at a time selected by the customer. For example, if a customer is sick and happens to be in need of a particular load asset 107, then he or she may opt to exercise an over-ride of an energy load control device 105 assigned to a particular load asset 107, such as an air-conditioning unit. The over-ride control parameter 612 may indicate if a particular customer has the ability to over-ride a given energy load control device 105.

Similar to the over-ride control parameter 612, the holiday control parameter 615 can indicate if a customer has elected to exercise control over a particular load asset 107 on holidays, such as government holidays or religious holidays. The run times parameter 618 may indicate when a particular load asset 107 is available for operation. The consecutive days parameter 621 may indicate a limit of consecutive days in which an energy load control device 105 can exercise control over a particular load asset 107. These rate control contract parameters 187 can be tracked by the database 179. Specifically, one or more program domain objects within the central controller program domain objects 1100 can be assigned to track the rate control contract parameters 187. Further details of these program domain objects will be discussed and described in detail below in connection with FIG. 11.

Figure 7:
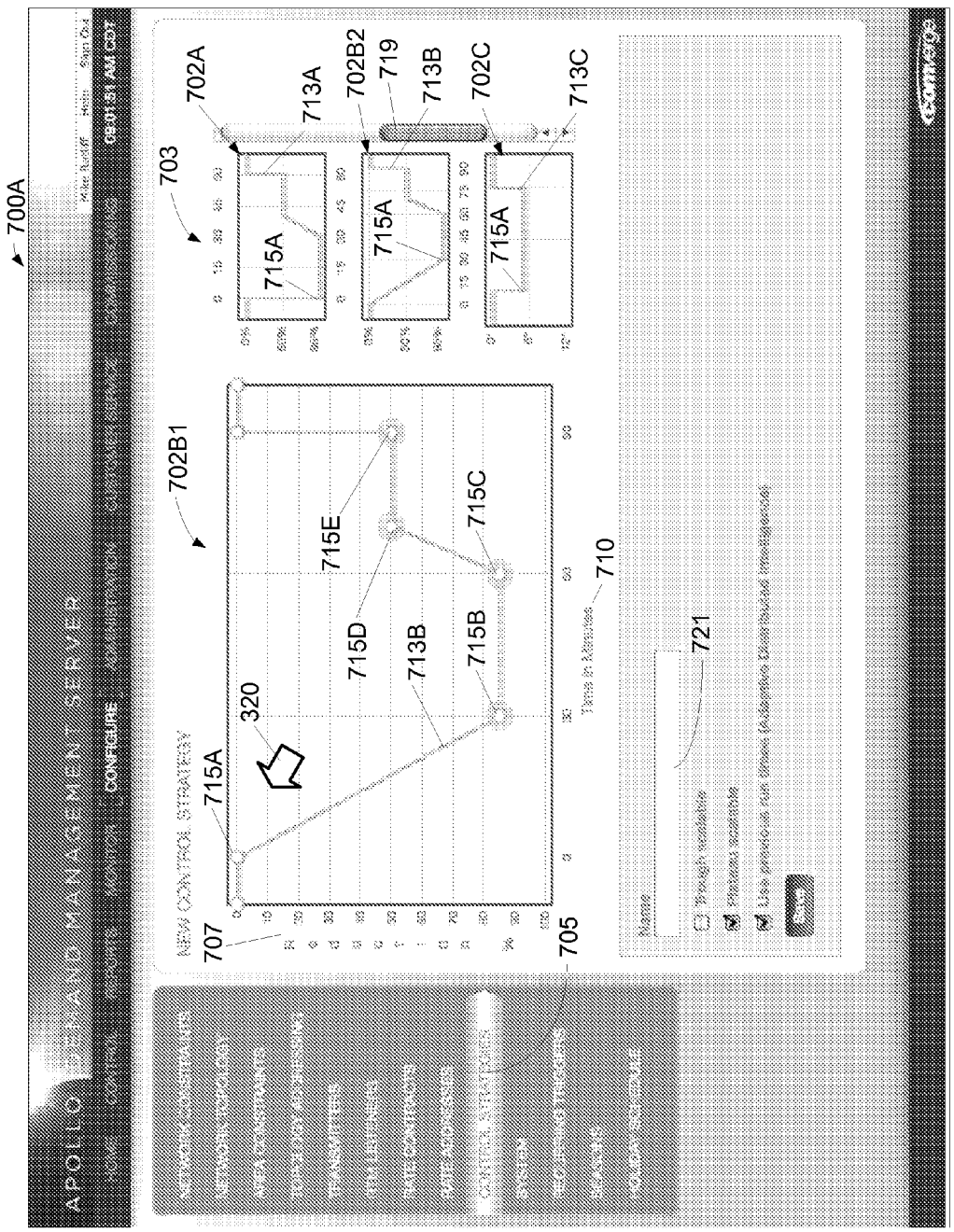
FIG. 7 is an exemplary computer display of a graphical user interface for displaying energy control strategies and receiving selected energy control strategies according to an exemplary embodiment of the invention.

FIG. 7 is an exemplary computer display 700A of a graphical user interface for displaying energy control strategies 702 and for receiving selected energy control strategies 702 according to an exemplary embodiment of the invention. The computer display 700A may be generated in response to a user selecting a control strategies option 705 from a navigational panel positioned on the left side of the display 700A.

An control strategy 702 can comprise a template that includes a graph which plots rate reduction in percentage on the Y-axis 707 against a period of time on the X-axis 710. The templates can have predefined geometries in which an energy control plot (line/curve) 713 has a certain defined shape generally with respect to both the X-axis 710 and the Y-axis 707. This means that the templates of energy control strategies 702 can be customizable with respect to certain points 715 forming the energy control plot (line/curve) 713 or generally across the X-axis 710 or Y-axis 707 or both. The customizable aspects of the templates across the X-axis and Y-axis will be described in more detail below in connection with FIG. 8.

The computer display 700A can provide a list 703 of various energy control strategies 702 that can be selected by a user. While templates that include graphs are illustrated for the energy control strategies 702 that can be selected, one of ordinary skill in the art recognizes that energy control strategies 702 could be identified by other ways such as by an alpha-numeric text name. The list 703 can be provided with a scrolling bar that has a scrolling button 719 which can be selected so that the list 703 can be traversed by a user. When a user selects a particular control strategy 702 from the list 703, the computer display 700A can generate the selected control strategy 702B1 with an increased level of magnification.

Each control strategy 702 may comprise an energy control plot (line/curve) 713 that has a various number of points 715. These points 715 may be adjusted or customized by the user. The points 715 can be adjusted by a user with a screen pointer 320 that can be used to select and then reposition a particular point 715 along the graph 702B1. As noted previously, the Y-axis 707 may comprise levels of a rate reduction expressed in a percentage while the X-axis 710 may comprise time in any intervals that may be chosen by the user. In the exemplary embodiment illustrated in FIG. 7, the X-axis 710 has been selected to be expressed in minutes. However, other increments of time are within the scope of the invention.

Each control strategy 702 may have different predefined geometries that gives a user options on what energy control strategies 702 that should be applied to one or more energy load control devices 105. For example, the selected template 702B1 provides an approximately 85% rate reduction over the interval of 0 to 30 minutes between the first point 715A and the second point 715B. This approximately 85% rate reduction is continued for about 30 minutes between the second point 715B and the third point 715C.

Next, the approximately 85% rate reduction of the plot 713B is decreased to an approximately 50% rate reduction between the third point 715C and the fourth point 715D. Between the fourth point 715D and the fifth point 715E, the approximately 50% rate reduction can be continued for approximately 20 minutes. At the fifth point 715E which also corresponds to the 90 minute mark on the X-axis 710, the approximately 50% rate reduction can be decreased down to 0% in order to end the selected control strategy 702.

Meanwhile, the first control strategy 702A which was not selected by the user can have a different geometry relative to the second selected control strategy 702B1. This different geometry translates into a different rate reduction over time relative to the selected control strategy 702B1.

As noted above, the plot 713B for the selected control strategy 702B1 is customizable. The customization of the plot 713B is discussed in further detail below in connection with FIG. 8. After the plot 713B1 is adjusted or customized by the user, the user may create and assign a unique alphanumeric identifier 721 to the customized plot 713B1.

After providing the selected and customized control strategy 702B1 with an alphanumeric identifier 721, this selected and customized control strategy 702B1 can be applied to the energy load control devices 105 that were selected in the computer displays 300A, 300B. The central controller 102 automatically transmits the appropriate messages to the energy load control devices 105 in order to implement the selected and customized control strategy 702B1. As noted previously, the energy load control devices 105 can reside in different networks 104 that have different communication protocols.

This means that the messages to implement the selected and customized control strategy 702B1 may be different and unique for each corresponding network 104 that supports a particular energy load control device 105. Further details about the messages for implementing selected rate control strategies 702 are discussed below in connection with FIG. 14.

Figure 8:
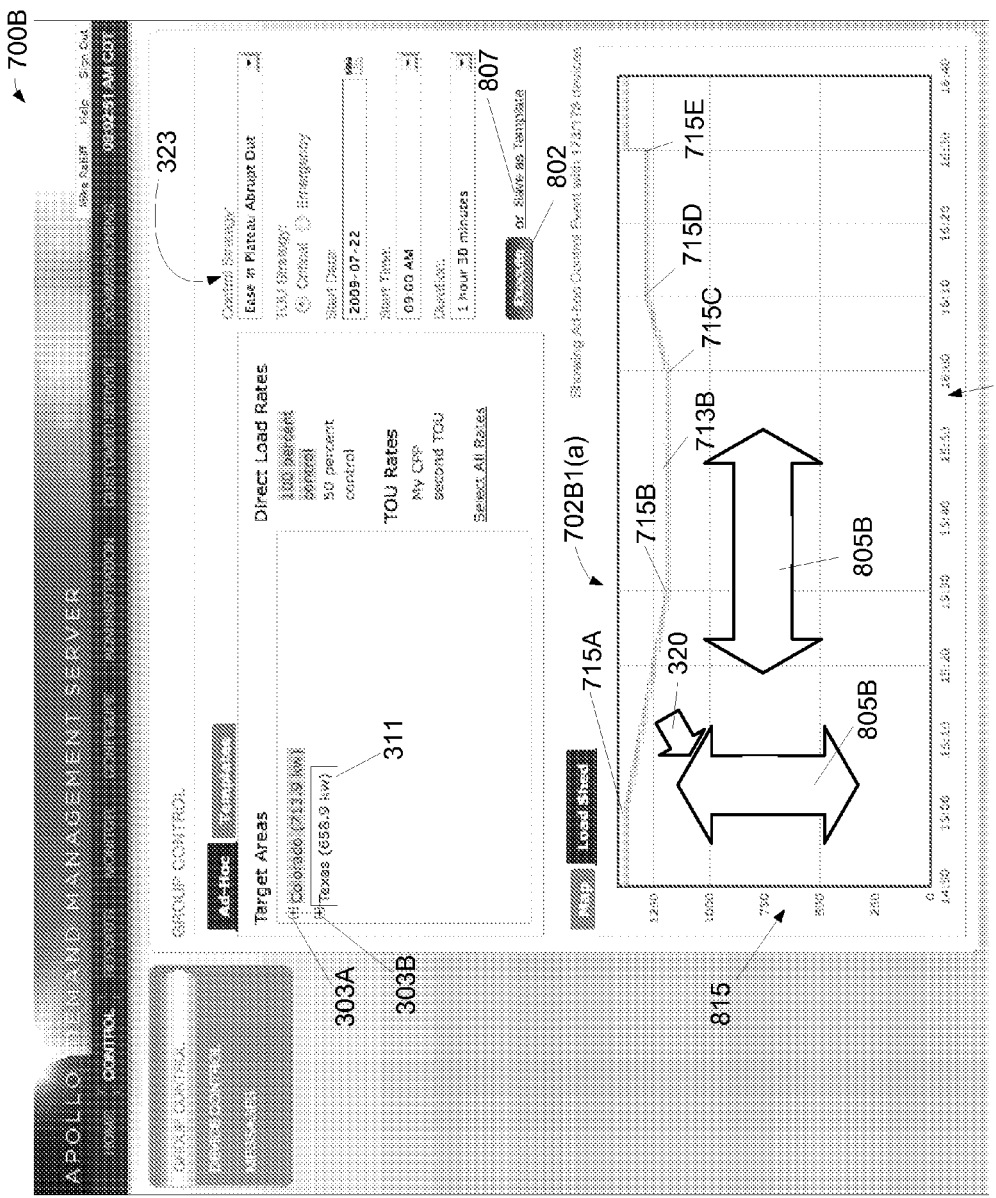
FIG. 8 is an exemplary computer display of a graphical user interface for receiving customization data for a selected control strategy according to an exemplary embodiment of the invention.

FIG. 8 is an exemplary computer display 700B of a graphical user interface for receiving customization data for a selected control strategy 702B1(*a*) according to an exemplary embodiment of the invention. FIG. 8 shares many elements which are common to those found in FIG. 7. Therefore, only the differences between these two Figures will be described in detail below.

In FIG. 8, the Y-axis 807 has been customized by the user. Instead of the Y-axis 807 comprising rate reduction expressed in percentage, the Y-axis 807 is selected to display an amount of energy such as kilowatt hours. The X-axis 710 still comprises units of time, however, the time illustrated list specific hours in the day using any 24 hour format.

According to one exemplary embodiment of the invention, each of the points 715A-E can be selected by the user so that the user can adjust each of these five points along the x-axis 710 and the y-axis 807. This means that the relative positions of the points 715 along the energy control plot 713 can be moved so that the amount of reduction between the points 715 along the y-axis 807 can be adjusted as indicated by the directional arrows 805A,B. Further, as indicated by the directional arrow 805B, the amount of time between the points 715 along the x-axis 710 can be adjusted so that the points 715 can be adjusted to the left or to the right.

However, the overall geometry of the plot 713B corresponding to the control strategy 702B1(*a*) must generally be maintained so that it corresponds with the original control strategy 702B1 that was selected and which did not have any customizations. The overall geometry of the plot 713 generally must be maintained since the geometry of the plot 713 governs the types of messages that are sent out across the various networks to reach the energy load control devices 105. Further details of the relationship between the geometry of the plot 713 and the control messages generated by the central controller 102 will be described in further detail below in connection with FIG. 14.

After the plot (line/curve) 713B has been customized by the user, then the user may select the "execute" button 802 on the display 700B so that the central controller domain objects 1100 can generate the appropriate messages for sending across the various networks 104 to the energy load control devices 105 which correspond to the selected node 303B as indicated by the rectangular box 311. This means that all of the selected energy load control devices 105 of the state of Texas will be scheduled to implement a customized and selected control strategy 702B1(*a*). Alternatively, the user may store or save the customized control strategy 702B1(*a*) for later or future use by selecting the "save as template" option 807.

Figure 9:
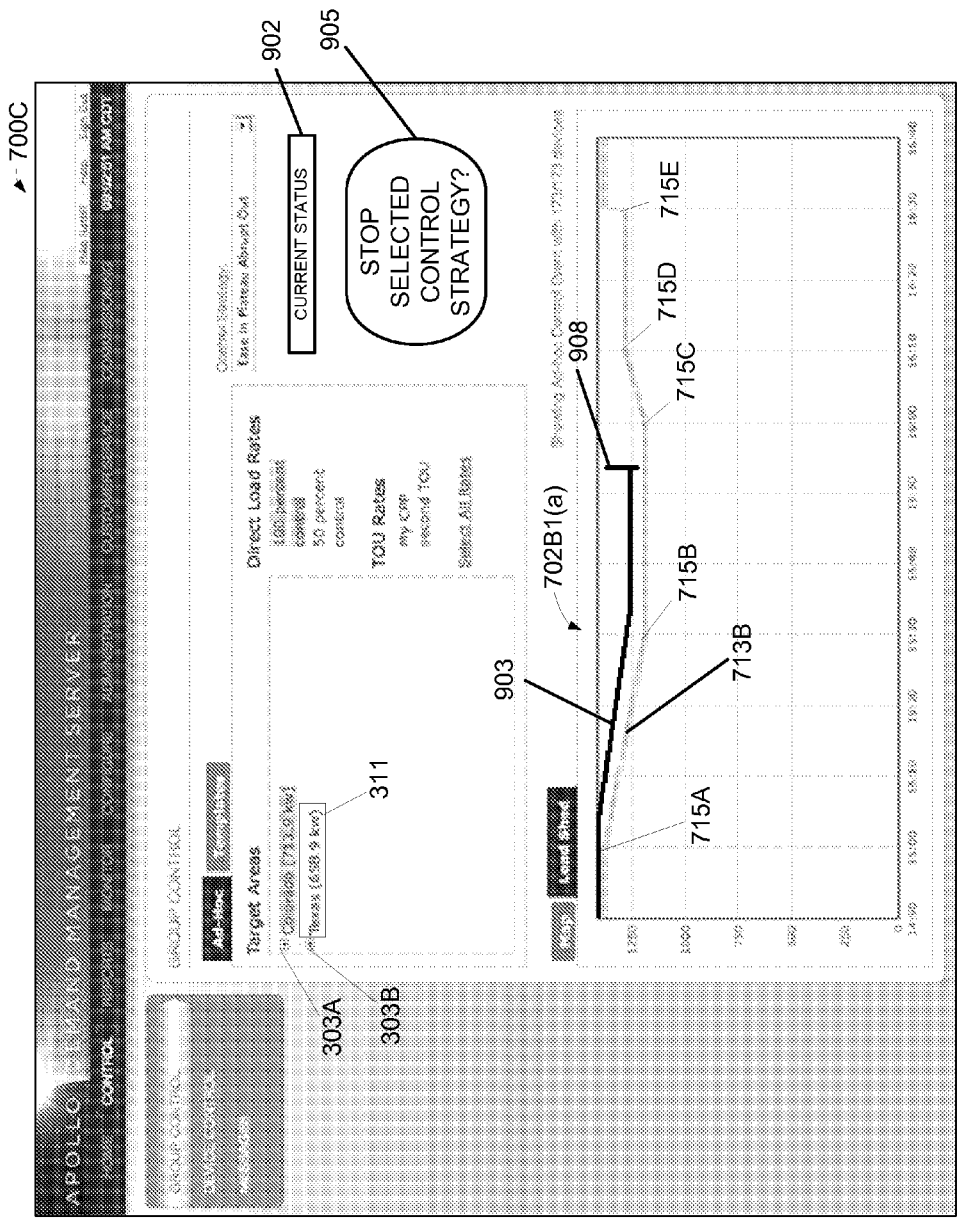
FIG. 9 is an exemplary computer display of a graphical user interface for displaying a theoretical model of a selected control strategy and real-time data from energy load control devices implementing the selected control strategy according to an exemplary embodiment of the invention.

FIG. 9 is an exemplary computer display 700C of a graphical user interface for displaying a theoretical model of a selected control strategy 702B1(*a*) and real-time data from energy load control devices 105 implementing the customized and selected control strategy 702B1(*a*) according to an exemplary embodiment of the invention. FIG. 9 shares many elements which are common to those found in FIG. 8. Therefore, only the differences between these two Figures will be described in detail below.

In FIG. 9, a second plot 903 is displayed adjacent to the first plot 713B of the customized control strategy 702B1(*a*). The second plot 903 may comprise performance data collected from the various energy control devices 105 that may send data back to the central controller 102. In other words, the second plot 903 may comprise real-time data corresponding to the various energy control devices 105 which may be implementing the customized control strategy 702B1(*a*). This real-time data or near real-time data may be tracked by a telemetry program domain object that is part of the central controller domain objects 1100 as described in further detail below in connection with FIG. 11.

The second plot 903 may be incomplete relative to the theoretical plot 713B of the customized control strategy 702B1(*a*). In other words, the second plot 903 may stop displaying data when the current time 908 is reached. As time progresses, the second plot 903 can be updated by the central controller 102 as the central controller 102 receives data from the various energy load control devices 105. To make sure that the central controller 102 has updated the data for the second plot 903, the user can select a "current status" button 902 that is projected on the display 700C. When the "current status" button 902 is selected by the user, the central controller 102 can check any telemetry data that has been received through the telemetry domain object 1127. The telemetry domain object 1127 is described in further detail below in connection with FIG. 11.

The display 700C may also provide a user interface such as a button 905 that can be selected in order to stop a particular control strategy 702. If the button 905 is selected, the central controller 102 can issue commands to the various energy rate control devices 105 in order to stop the execution of the selected control strategy 702.

Figure 10:
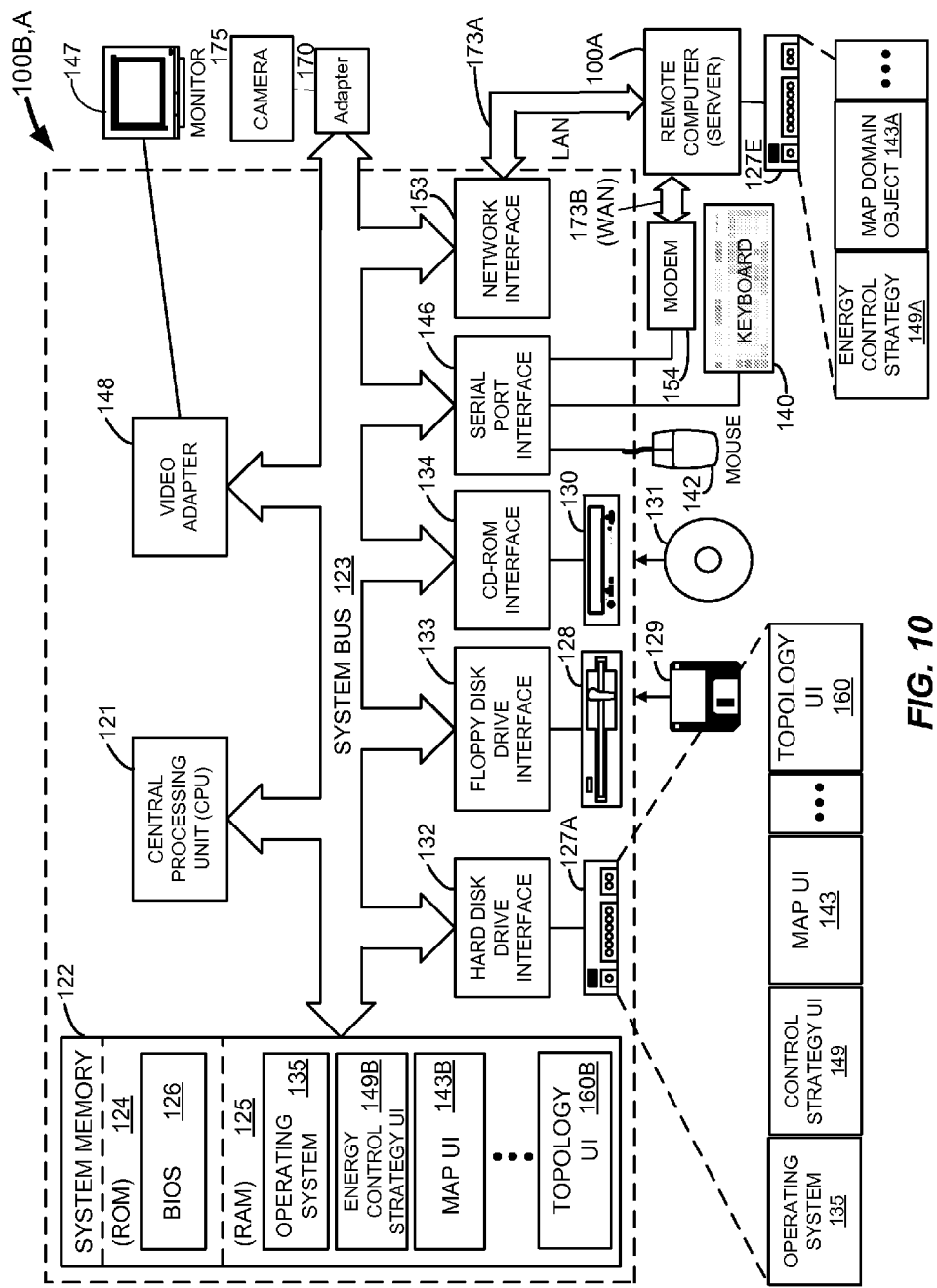
FIG. 10 is a functional block diagram of a computer that can be used in the method and system that can communicate across different types of networks to reach various energy load control devices according to an exemplary embodiment of the invention.

FIG. 10 is a functional block diagram of a computer 100 B,A that can be used in the method and system that can communicate across different types of networks 104 to reach various energy load control devices 105 according to an exemplary embodiment of the invention. The exemplary operating environment for the system 101 of FIGS. 1 and 2 includes a general-purpose computing device in the form of a conventional computer. Generally, the client device 100B includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 100B, such as during start-up, is stored in ROM 124.

The client device 100B, which may be a computer, can include a hard disk drive 127A for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a floppy disk drive interface 133, and an optical disk drive interface 134, respectively.

Although the exemplary environment described herein employs hard disk 127A, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in smaller client devices 100B such as in cellular phones and/or personal digital assistants (PDAs). The drives and their associated computer readable media illustrated in FIG. 10 provide nonvolatile storage of computer-executable instructions, data structures, program domain objects, and other data for computer or client device 100B.

A number of program domain objects may be stored on hard disk 127, magnetic disk 129, optical disk 131, ROM 124, or RAM 125, including an operating system 135, an control strategy user interface domain object 149B, a map user interface domain object 143B, and a topology user interface domain object 160B. Program domain objects include routines, sub-routines, programs, objects, components, data structures, modules, etc., which perform particular tasks or implement particular abstract data types. Aspects of the present invention may be implemented in the form of a downloadable, client-side, browser based control strategy user interface domain object 149B and the topology user interface domain object 160B which are executed by the client device 100B in order to provide control over various energy load control devices 105 which may reside in different networks 104.

A user may enter commands and information into computer 100B through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. The display 147 can comprise any type of display device such as a liquid crystal display (LCD), a plasma display, an organic light-emitting diode (OLED) display, and a cathode ray tube (CRT) display.

A camera 175 may also be connected to system bus 123 via an interface, such as an adapter 170. The camera 175 can comprise a video camera such as a webcam. The camera 175 can be a CCD (charge-coupled device) camera or a CMOS (complementary metal-oxide-semiconductor) camera. In addition to the monitor 147 and camera 175, the client device 100B, comprising a computer, may include other peripheral output devices (not shown), such as speakers and printers.

The client device 100B, comprising a computer, may operate in a networked environment using logical connections to one or more remote computers, such as the server 100A. Remote computers may be another personal computer, a server, a client, a router, a network PC, a peer device, or other common network node. While the server 100A or a remote computer typically includes many or all of the elements described above relative to the client device 100B, only a memory storage device 127E has been illustrated in FIG. 10. The logical connections depicted FIG. 10 include a local area network (LAN) 173A and a wide area network (WAN) 173B. Such networking environments are commonplace in offices, enterprise-wide computer networks, intranets, and the Internet.

When used in a LAN networking environment, the client device 100B, comprising a computer, is often connected to the local area network 173A through a network interface or adapter 153. When used in a WAN networking environment, the client device 100A, comprising a computer, typically includes a modem 154 or other means for establishing communications over WAN 173B, such as the Internet. Modem 154, which may be internal or external, is connected to system bus 123 via serial port interface 146. In a networked environment, program domain objects like the control strategy user interface domain object 149A and the map user interface domain object 143A depicted relative to the server 100A, or portions thereof, may be stored in the remote memory storage device 127E. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program domain objects may be located in both local and remote memory storage devices.

Figure 11:
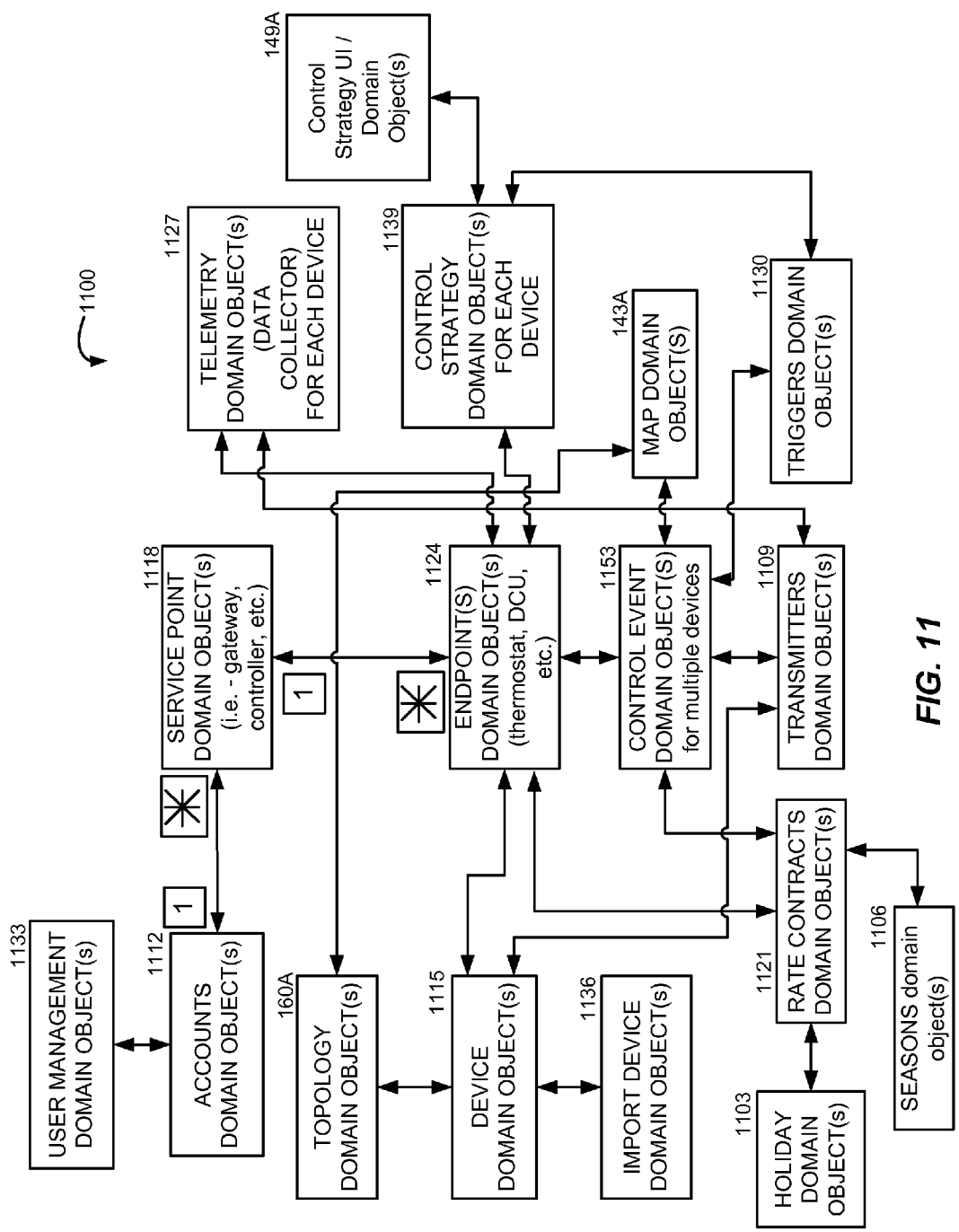
FIG. 11 is a functional block diagram illustrating an exemplary domain model/software architecture that shows the different relationships between the software domain objects according to an exemplary embodiment of the invention.

FIG. 11 is a functional block diagram illustrating an exemplary domain model/software architecture 1100 that shows the different relationships between the software domain objects according to an exemplary embodiment of the invention. The accounts program domain object 1112, which is responsible for tracking the unique identifier that is assigned to each energy load control device 105 and the network address as well as the physical or real-world address of each energy load control device 105, is logically coupled to the service point program domain object 1118. The service point program domain object 1118 tracks gateways 105C as well as other similar energy load control devices 105 that are generally one position away or once removed relative to the load asset 107 that they are controlling.

The accounts program domain object 1112 can comprise computer code that tracks the unique identifier that is assigned to each energy load control device 105 and that generally correspond with a particular customer. The accounts program domain object 1112 can also track the network address as well as the physical or real-world address of each energy load control device 105. In other words, the accounts program domain object 1112 can store and map the both networking address data as well as geocode data for each energy load control device 105. In addition to the geocode data, the accounts program domain object 1112 can monitor the opt-in and opt-out capabilities of the customer. In other words, the accounts program domain object 1112 can track the over-rides 612 permitted by a customer as discussed above in connection with the rate control contract parameters 187 of FIG. 6. The accounts program domain object 112 can also determine if a particular customer is allowed access to a web portal for managing energy load control devices 105 and related load assets 107.

The service point program domain object 1118 can keep a list of transmitter program domain objects 1109 that may be used for each service point for establishing communications between a respective service point and the central controller 102. The service point program domain object 1118 can comprise computer code that tracks the capabilities of energy load control devices 105 that may comprise gateways 105C or other intermediate controllers that are not endpoints as perceived by the central controller 102. For example, the gateway 105C of the open standard protocol controller 104C may be referred to as a service point by the service point program domain object 1118

A gateway 105C can comprise an Internet network interface for a home energy control system currently sold by Digi International as a Energy Service Portal (ESP) gateway. Alternatively, the gateway 105C of the network 104C can comprise an AMI transmitter such as the one currently sold by ITRON as the OpenWay CENTRON smart meter. In other networks, such as network 104B of FIG. 1, the paging transmitter 109 can be treated by the service point domain object 1118 as a service point. The capabilities tracked by the service point domain object 1118 can include, but are not limited to, the communication protocol used by a particular service point 105C, A, and the specific endpoints such as energy load control devices 105, like the thermostat 105C1 or thermostats 105 A1-105A4 of FIG. 1, that are connected to a particular service point.

The relationship between the accounts program domain object 1112 and the service point program domain object 1118 is that of a "one-to-many" (1 to "asterisk" as illustrated in FIG. 11, where the "asterisk" is a variable representing one or more service points) relationship. This means that the accounts program domain object 1112 can be in communication with a plurality of service point program domain objects 1118 which generally correspond to gateways 105C. This means that the accounts program domain object 1112 can service a large group of service point program domain objects 1118 that generally correspond with a large group of gateways 105C.

The service point program domain object 1118 can also have a logical coupling with the endpoint program domain objects 1124. The endpoint program domain objects 1124 generally correspond with those energy load control devices 105 that are directly adjacent to one or more load assets 107. As mentioned above, an endpoint can comprise an energy load control device 105 such as a thermostat 105C1 of the network 104C. Similarly, an endpoint can also comprise a digital control unit 105A in the multi-dwelling unit setting in which the digital control unit 105A services a plurality of different separate dwellings or separate households.

In the exemplary embodiment illustrated in FIG. 1, the DCU 105A is coupled to four thermostats 105A1-A4. Under this logical framework or relationships between the service point program domain objects 1118 and the endpoint program domain objects 1124, the relationship between these two domain objects is that of a "one-to-many" (1 to X) relationship, similar to the relationship between the accounts domain object 1112 and the service point program domain object 1118.

That is, the service point program domain object 1118 can be logically coupled to a plurality of endpoint program domain objects 1124 that generally correspond to energy load control devices 105 that are just one level or one layer away from the load assets 107 that they control. This "one-to-many" relationship between the service point program domain object 1118 and various endpoint program domain objects 1124 solves the multidwelling unit problem that was discussed previously in which four different thermostats 105A1-A4 for four different customers art coupled to a single digital control unit 105A as illustrated in FIG. 1.

The end points program domain object 1124 can comprise computer code that tracks the physical topology data 305 for endpoints discussed above selected through the map 314 and/or topology 305. The endpoints generally comprise energy load control devices 105 and rate notification systems 110. The end points program domain object 1124 can map and store the particular energy load control strategies 702 that are selected by a user in the user interface of FIG. 7 for certain nodes 303 within the topology data 305.

In addition to the logical coupling to the service point program domain object 1118, the endpoint program domain object 1124 can also be logically coupled with the telemetry domain object 1127, the control strategy domain object 1139, the device program domain object 1115, and the control event program domain object 1153. The telemetry program domain object 1127 can collect performance data on both the endpoint that may comprise the energy load control device 105 as well as performance data on the actual load asset 107 being controlled.

The telemetry program domain object 1127 can comprise computer code that tracks the performance of endpoints that generally comprise energy load control devices 105. The telemetry program domain object 127 can also track the performance of load assets 107 that may be coupled to the energy load control devices 105. For example, for energy load control devices 105 that comprise thermostats, the telemetry program domain object 1127 can track when a thermostat turns an air-conditioning unit on and off. For energy load control devices 105 that may comprise electric meters, the telemetry program domain object 1127 can track the kilowatt power consumption of a customer. The telemetry program domain object 1127 can maintain separate files of performance data for each endpoint being tracked.

The control strategy program domain object 1139 can track the customizations for a selected energy load control strategy 702 and the unique messages that are required to implement the selected energy load control strategy 702 for each endpoint that generally comprises an energy load control device 105. Specifically, the control strategy program domain object 1139 can comprise computer code that is directly linked to the control strategy user interface program domain object 149A. The control strategy program domain object 1139 can map and store the customization data received from the control strategy user interface program domain object 149A. The control strategy program domain object 1139 can also be directly linked to the triggers program domain object 1130 so that it can communicate how control messages of the triggers program domain object 1130 may need to be adjusted with respect to magnitude, timing (start times, stop times), and duration based on the customization made by the user.

The control event domain object 1153 is created for each control strategy 702 that is selected by the user and tracked by the control strategy domain object 1139. The control event domain object 1153 is used to control several endpoint domain objects 1124. The control event domain object 1153 gathers data from the rate contracts domain object 1121 and the control strategy domain object 1139.

The control event domain object 1153 communicates with the triggers domain object 1130 in order to determine how a selected control strategy 702 will be initiated or started among the various load control devices 105 that were selected to be part of the control strategy 702. The triggers program domain object 1130 can comprise computer code that tracks the timing and types of messages which are needed for a particular energy control strategies 702 that may be selected by a user of the central controller 102.

The triggers program domain object 1130 can map and maintain tables of messages and timing for those messages in order to implement particular energy control strategies 702 that can be selected by a user. In other words, the triggers program domain object 1130 can maintain tables of messages and corresponding timing of those messages which correspond to each control strategy template 702 that can be displayed in the list 703 of a user interface illustrated in FIG. 7. The tables of messages and timing of those messages for each control strategy 702 are discussed in further detail below in connection with FIG. 14.

The control event domain object 1153 also communicates with the transmitters program domain object 1109 so that it will know how to communicate with the various load control devices 105 that were selected for the particular control strategy 702. The transmitters program domain object 1109 can comprise computer code that tracks how messages can be sent to energy load control devices 105. The transmitters program domain object 1109 determines the type of network 104 in which an energy load control device 105 may be part of.

For example, the transmitter program domain object 1109 can track whether an energy load control device 105 is part of a paging network, a broadband network, or a web service network. The transmitter program domain object 1109 can keep track of the communication protocols which need to be followed in order to communicate with an energy load control device 105 and that are dependent upon the type of network in which the energy load control device 105 resides. This transmitter program domain object 1109 frequently communicates with the telemetry program domain object 1127 which will be described in further detail below.

The rate contracts program domain object 1121 can be consulted by the control event domain object 1153 in order to identify the set of constraints that have been established by a rate control contract executed by a customer for a particular energy load control device 105. The rate contracts program domain object 1121 can comprise computer code that tracks the constraints of endpoints as dictated by rate contracts for particular energy load control devices 105. The rates contract program domain object 1121 can access the holiday program domain object 1103 and the seasons program domain object 1106 in order to store and map the constraints for particular endpoints that generally comprise the energy load control devices 105. The constraints can comprise the timing restrictions with respect to when an energy load control device 105 may be controlled by the central controller 102 as dictated by a particular rate control contract executed by a customer.

The device program domain object 1115 can track the number and type of load assets 107 that are coupled to the endpoints which generally comprise the energy load control devices 105. The device program domain object 1115 can also track the capabilities of the load assets 107 as well as capabilities for the energy load control devices 105.

The holidays program domain object 1103 can comprise computer code that tracks the days in which energy load control devices 105 cannot be used for a particular customer. The holidays program domain object 1103 basically stores and maps several of the rate control contract parameters 187 as illustrated in FIG. 6 and described above. Similar to the holidays program domain object 1103, the seasons program domain object 1106 can track the seasonal boundaries of use for energy load control devices 105 for each customer of an energy supplier or energy reseller. The seasons program domain object 106 stores and maps several of the rate control contract parameters 187 as illustrated in FIG. 6 and described above. The holiday domain object 1103 and seasons domain object 1106 are in communication with the rate contract domain object 1121.

The devices program domain object 1115, which communicates with the endpoint domain objects 1124 and the transmitters domain object 1109, can comprise computer code that tracks the capabilities of each load asset 107 in the system 101. In other words, the devices program domain object 1115 tracks the type of load asset 107, the manufacturer of the load asset 107, the communication protocol used for a particular load asset 107, and how the load asset 107 may be connected to a particular network 104. The devices program domain object 115 can also track the capabilities of each energy load control device 105. That is, the devices program domain object 1115 tracks the type of energy load control device 105, the manufacturer of the energy load control device 105, the communication protocol used for a particular energy load control device 105, and how the energy load control device 105 may be connected to a particular network 104. The devices program domain object 1115 will generally refer to energy load control devices 105 as endpoints in its communications with other program domain objects within the software architecture 1100.

The devices program domain object 1115 may also refer to notification systems 110 of commercial and industrial systems as endpoints. The devices program domain object 1115 may track the capabilities of the notification systems 1110 that are treated in computer code like endpoints similar to the energy load control devices 105.

The topology program domain object 160A generally corresponds with the topology user interface program domain object 160B that may be executed by the client device 100B as illustrated in FIG. 2 and discussed above. The topology program domain object 160A generally communicates with the device domain object 1115. The topology program domain object 160A may provide the computer displays illustrated in FIGS. 3-5. The topology program domain object 160A can comprise computer code that tracks the physical addresses or geocode assigned to each particular energy load control device 105 and each load asset 107.

The topology program domain object 160A can also track the various layers or levels for the topology data 305 that has been created for groups of energy load control devices 105. As noted above in connection with FIG. 5, energy suppliers or resellers can create their own topology 305 for the groups of energy load control devices 105 that are within their control. Also noted above, several different topologies 305 may be maintained for each energy load control device 105. These different topologies 305 may be tracked by the topology program domain object 160A.

The user management program domain object 1133, which is in communication with the accounts domain object(s) 1112 can comprise computer code that monitors and controls how a user may gain access to the central controller 102. The user management program domain object 1133 can restrict access to the central controller 102 depending upon the role that may be assigned to a particular user. In other words, the user management program domain object 1133 can limit access to the central controller 102 and all of its functions based upon the level of access which may be assigned to a particular user.

The control strategy user interface program domain object 149A generally corresponds with the control strategy user interface 149B that may be executed by the client device 100B as illustrated in FIG. 2 and discussed above. The control strategy user interface program domain object 149A generally communicates with the control strategy program domain object 1130. The control strategy user interface program domain object 149A may be responsible for generating the computer displays 700A-700C of FIGS. 7-9 discussed above. The control strategy user interface program domain object 149A can comprise computer code that receives the customization data or selections of the user through the user interfaces of computer displays 700A-700C. Specifically, the control strategy user interface program domain object 149A can track the fine tuning adjustments received from the user for the points 715 of the energy control plot 713 of FIG. 8.

The import device program domain object 1136, which is coupled to the device domain object 1115, can comprise computer code that can process batch files which describe the properties of energy load control devices 105. This import device program domain object 1136 can be responsible for determining and assigning geocodes for both energy load control devices 105 and load assets 107. This program domain object 1136 can also be responsible for determining the network addressing for each particular energy load control device 105 and load asset 107. Further functions of the import device program domain object 1136 will be described in detail below in connection with FIG. 13A.

The map program domain object 143A, which is coupled to the control event domain object 1153, generally corresponds with the map user interface domain object 143B that is executed by the client device 100B in FIG. 2. The map domain object 143A can work with the map user interface domain object 143B to render the various maps 314 illustrated in FIGS. 3-4. The map domain object 143A can receive selections of energy load control devices 105 that are displayed within a map 314. The map program domain object 143A can relay the selections to the topology program domain object 160A so that the topology program domain object 160A can produce topology data 305 that corresponds with the energy load control devices 105 that may be selected from a particular map 314. The map program domain object 143A may also receive data from the topology program domain object 160A and can generate maps 314 that generally mirror the selections of energy load control devices 105 that may be selected according to a particular topology 305.

Figure 12:
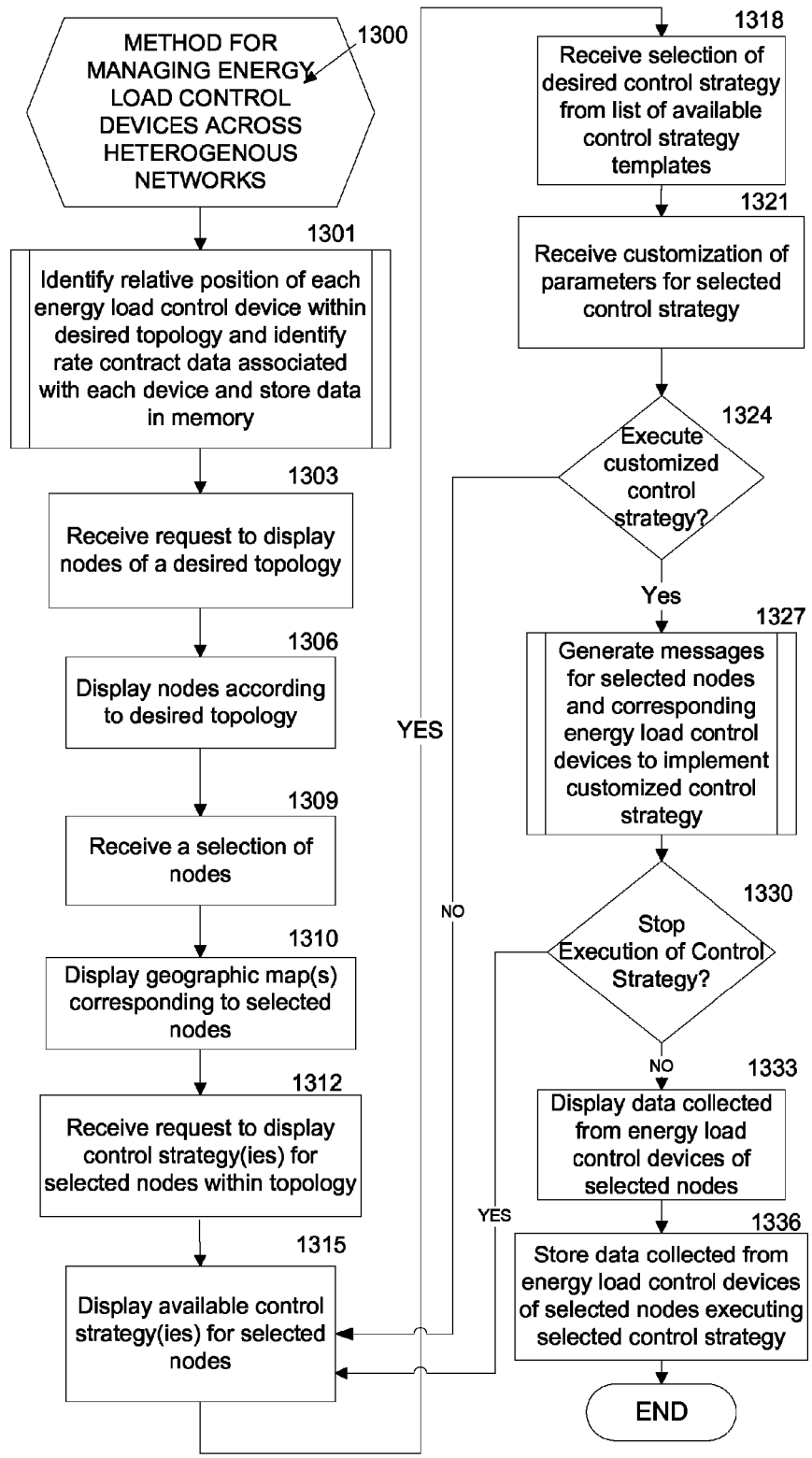
FIG. 12 is a logic flow diagram highlighting various steps of a method for managing energy load control devices across a various heterogeneous networks according to an exemplary embodiment of the invention.

FIG. 12 is a logic flow diagram highlighting various steps of a method 1300 for managing energy load control devices 105 across a various heterogeneous networks 104 according to an exemplary embodiment of the invention. One of ordinary skill in the art will appreciate that the functions described herein as they relate to central controller 102 can comprise firmware code executing on a microcontroller, microprocessor, a DSP, or state machines implemented in application specific integrated circuits (ASICs), programmable logic, or other numerous forms without departing from the spirit and scope of the invention.

In other words, these steps illustrated in FIG. 12 and any other logic flow diagrams of this disclosure maybe provided as a computer program which may include a machine-readable medium having stored there on instructions which may be used to program a computer (or other electronic devices) to perform a process according to the invention. The machine-readable medium may include, but is not limited to, a floppy diskette, optical disk, CD-ROM, magneto-optical disks, ROMs, RAMs, EEPROMs, EEPROMs, magneto-optical cards, flash memory, or other type of medias/machine-readable mediums suitable for storing electronic instructions.

Further, certain steps in the processes or process flow described in this specification must naturally precede others for the invention to function as described. However, the invention is not limited to the order of the steps described if such order or sequence does not alter the functionality of the invention. That is, it is recognized that some steps may performed before, after, or parallel other steps without departing from the scope and spirit of the invention. In some instances, certain steps can be deleted or not performed without departing from the invention.

Additionally, one of ordinary skill in programming would be able to write computer code or identify appropriate hardware at circuits to implement the disclosed invention without difficulty based on the flow charts and associated description in the application text, for example.

Therefore, disclosure of a particular set of program code instructions or detailed hardware devices is not considered necessary for an adequate understanding of how to make and use the invention. The inventive functionality of the claimed computer implemented processes will be explained in more detail in the following description and in conjunction with the Figures which may illustrate various process flows.

Referring back to FIG. 12, routine or sub-method 1301 is the first step of the method 1300 in which the relative position of each energy load control device 105 within a desired topology 305 is identified. In this step, the rate contract data 187 which is associated with each energy load control device 105 is also identified and stored in memory. This routine or sub-method 1301 is described in further detail below in connection with FIG. 13A. This routine or sub-method 1301 is usually executed by the import device program domain object 1136 of the central controller 102. This routine or sub-method 1301 usually involves batch files that are transmitted by an energy supplier or energy reseller to the central controller 102.

Next, in step 1303, a request to display nodes 303 of a desired topology 305 can be received. This step generally corresponds with the computer displays 300A, 300B of FIGS. 3-4 which are produced by the topology user interface program domain object 160B of the client device 100B which works in conjunction with the topology program domain object 160A of the central controller 102.

In step 1306, the topology user interface program domain object 160B of the client device 100B can display the nodes 303 according to a selected topology 305. Next, the topology user interface program domain object 160B can receive a selection of nodes 303 in step 1309, such as those highlighted by the rectangular box 311 of FIG. 3.

In step 1310, the map user interface domain object 143B of the client device 1008 can work with the map domain object 143A of the central controller 102 in order to display a geographic map listing the energy load control devices 105 that correspond with the selected nodes 303 in the topology 305. In step 1312, a request can be received and processed by the control strategy user interface program domain object 149B of the client device 100B to display a listing 703 of one or more control strategies 702 for selected nodes 303 within the topology 305. In step 1315, the control strategy user interface program domain object 149B can display available control strategies 702 in the list 703 as illustrated in FIG. 7.

Next, in step 1318, the control strategy user interface program domain object 149B can receive a selection of a desired control strategy 702B2 from the list 703 of available control strategy templates 702 as illustrated in FIG. 7. In step 1321, the control strategy user interface program domain object 149B can receive customization of parameters for the selected control strategy 702B1. Specifically, in this step, the control strategy user interface program domain object 149B can receive adjustments or customizations as illustrated in FIG. 8 for the points 715 which form the energy control plot 713B of the selected control strategy 702B1 as illustrated in FIG. 7.

Next, in decision step 1324, the control strategy user interface program domain object 149B can determine if the user desires to execute the customized control strategy 702B1. In this step, the control strategy user interface program domain object 149B can assess or determine if the execute button 802 of FIG. 8 has been selected by the user.

If the inquiry to decision step 1324 is negative, then the "NO" branch is followed back to step 1315. If the inquiry to decision step 1324 is positive, then the "YES" branch is followed to routine or sub-method 1327 in which messages are generated for the selected nodes 303 and the corresponding energy load control devices 105 in order to implement the customized control strategy 702B1. This routine or sub-method 1327 is generally performed by the control strategy program domain objects 1139 working in conjunction with the triggers program domain object 1130. Further details of this routine or sub-method 1327 are discussed in further detail below in connection with FIG. 15.

After routine or sub-method 1327, the process continues to decision step 1330 in which the control strategy user interface program domain object 149B can determine if the execution of the customized control strategy 702B1 should be interrupted or stopped. In this step, the control strategy user interface program domain object 149B can assess or determine if the stop button 905 illustrated in FIG. 9 has been selected by user.

If the inquiry to decision step 1330 is positive, then the selected control strategy 702B1 is halted and then the "YES" branch is followed back to step 1315. If the inquiry to decision step 1330 is negative, then the "NO" branch is followed to step 1333.

In step 1333, data collected from the energy load control devices 105 of the selected nodes 303 can be displayed as illustrated in FIG. 9. The control strategy user interface program domain object 149B can work with the telemetry program domain object 1127 to produce the visuals for the data collected from the energy load control devices 105. In step 1336, the data collected from the energy load control devices 105 through the telemetry program domain object 1127 can be stored in the database 179. The process then ends.

Figure 13A:
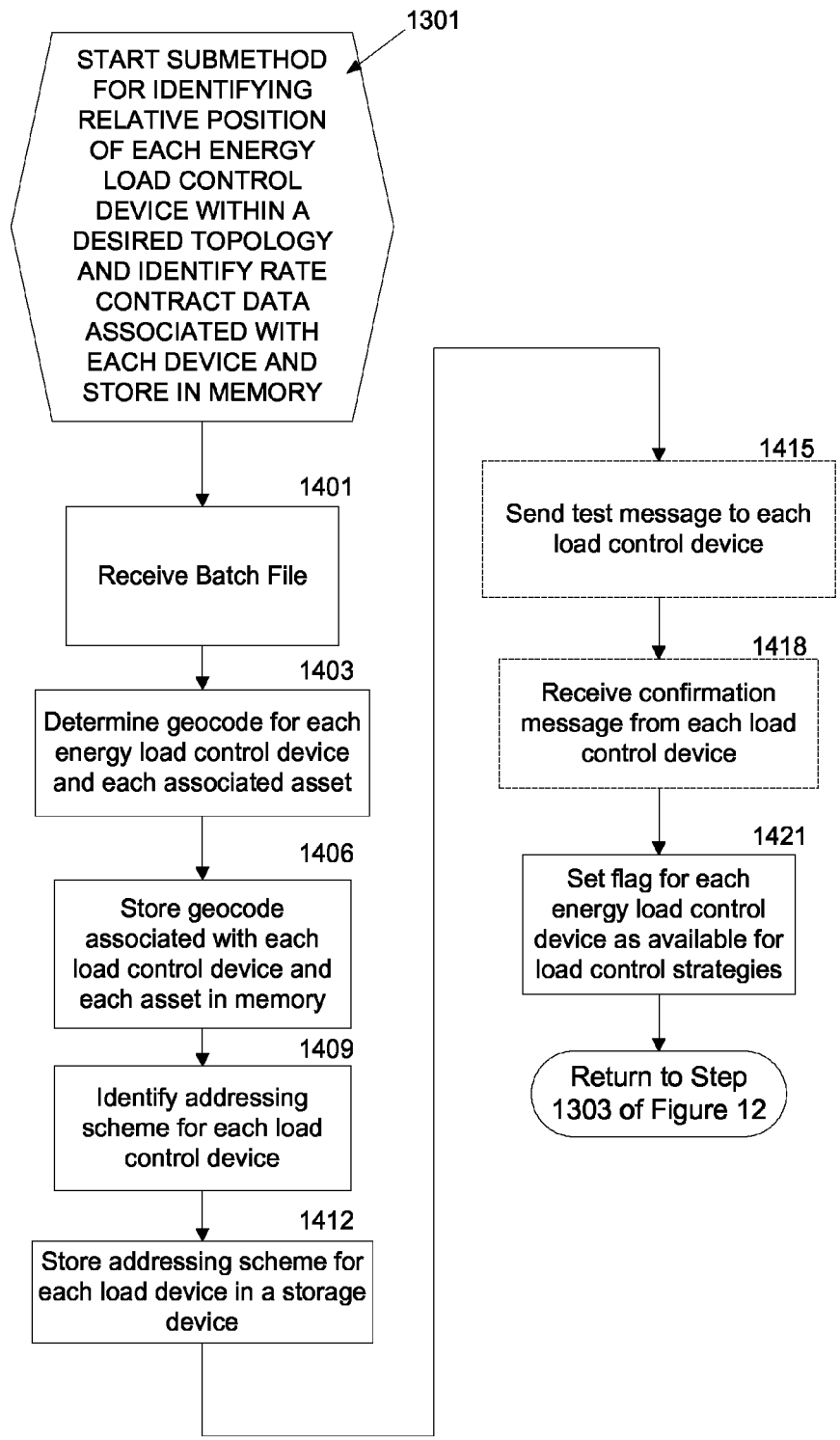
FIG. 13A is a logic flow diagram highlighting various steps of a sub-method or routine of FIG. 12 for identifying relative positions of each energy load control device within a desired topology and identifying rate contract data associated with each device according to an exemplary embodiment of the invention.

FIG. 13A is a logic flow diagram highlighting various steps of a sub-method or routine 1301 of FIG. 12 for identifying relative positions of each energy load control device 105 within a desired topology 305 and identifying rate contract data 187 associated with each device 105 according to an exemplary embodiment of the invention. Routine 1301 is generally executed by the import device program domain object 1136 as illustrated in FIG. 11.

Step 1401 is the first of routine 1301 in which the import device program domain object 1136 may receive a batch file 1400 as illustrated in FIG. 13B. The batch file 1400 may contain information such as the physical location of the energy load control device 105 or a load asset 107. Further details of the batch file 1400 will be described below in connection with FIG. 13B.

In step 1403, the import device program domain object 136 can determine a geocode for each energy load control device 105 and each associated load asset 107 based on the physical location information from the batch file 1400. A geocode can comprise the longitude and latitude coordinates of an energy control device 105 or a load asset 107 expressed in degrees and minutes. However, the invention is not limited to longitude and latitude coordinates. Other geographic coordinates or mapping systems besides latitude and longitude can be used and are within the scope of the invention.

Next, in step 1406, the import device program domain object 1136 can store the geocode calculated for each load control device 105 and each load asset 107 in memory or a storage device. In step 1409, the import device program domain object 1136, can identify the network addressing scheme for each energy load control device 105 and each load asset 107. In this step, the import device program domain object 136 can identify the appropriate addressing scheme for each imported energy load control device 105 and load asset 107 by working with the transmitter program domain object 1109 and by analyzing the device type for each control device 105 and load asset 107.

Also in this step 1406, the import device program domain object 1136 can appropriately place each control device 105 and each load asset 107 in the selected topology 305 selected by the user based on the parameters selected by the user for a particular topology 305. For example, in a geographic topology 305B as illustrated in FIG. 5, the import device program domain object 1136 can identify the appropriate nodes 303 for a particular energy load control device 105 based upon the geocode assigned to the particular energy load control device 105. In a reliability type topology 305A as illustrated in FIG.

5, the import device program domain object 1136 can identify the appropriate related nodes 303 relative to a particular load energy control device 105 by identifying relationships between the energy load control device 105 and other electric grid devices.

In step 1409, the import device program domain object 1136 can also identify the both the computer network address of each load control device 105 and the rate control contract data 187 that establishes control constraints for each energy load control device 105. The import device program domain object 1136 can create an association between the rate control contract data 187 and any particular energy load control device 105 being evaluated.

Next, in step 1412, this addressing scheme for each energy load control device 105 and each load asset 107 can then be stored in a storage device, such as in the database 179. In optional step 1415, the transmitter program domain object 1109 assigned to a particular energy load control device 105 can send a test message to the device 105 and/or to the load asset 107. Step 1415 has been illustrated with dashed lines to indicate that this step is optional and does not need to be performed. Also, in some cases, certain energy load control devices 105 may not have the ability to transmit a confirmation message back to the transmitter program domain object 1109.

Next, in optional step 1418, if a message was sent to a load control device 105 or a load asset 107, then in this step the transmitter program domain object 1109 can receive a confirmation message from each load control device 105 or each load asset 107. Similar to step 1415, step 1418 has been illustrated with dashed lines to indicate that this is also an optional step and does not need to be performed.

In step 1421, the import device program domain object 1136 can set a flag for each energy load control device 105 and each load asset 107 as available for being controlled for any energy control strategies selected by the user, such as those enumerated in the list 703 of FIG. 7. In this step, the import device program domain object 136 usually sets the flag to the "available" status for any new energy load control device 105 or any new load asset 107 added to the system 101. This flag can be set to an "unavailable" status when a particular energy load control device 105 or load asset is to be removed from the energy management system 101. For example, an energy supplier or energy reseller may wish to remove certain energy load control devices 105 or load assets 107 from the energy management system 101. In these situations, the import device program domain object 1136 can be used to set the flag for each device 105 or asset 107 to an unavailable state. The process then returns to step 1303 of FIG. 14.

FIG. 13B illustrates sample batch file data 1400 for an energy load control device 105 according to an exemplary embodiment of the invention. The batch file data 1400 can include, but is not limited to, a device type field 1403, a software field 1406, a network type field 1409, a protocol field 1412, a physical location field 1415, desired topology data field 1418, and a rate contract data field 1421. The device type field 1403 can identify the type or class for each energy load control device 105. For example, this field 1403 can indicate whether the device 105 is a thermostat 105A, a digital control unit 105B, or other like control device 105.

The software field 1406 of the batch file data 1400 can identify the manufacturer as well as the version number of the software for each energy load control device 105 or load asset 107. The network type field 1409 can identify the type of the communication protocol used for the network 104 in which the energy load control device 105 or load asset 107 resides.

For example, the network type field 1409 can indicate whether the communications protocol is an open standard like the Zigbee standard, or if the communication protocol is a proprietary, non-standard one. The protocol field 1412 can identify the specific type of communication protocol used for a particular energy load control device 105. So this field 1412 can identify the specific name of the protocol as well as its version number.

The physical location field 1415 can comprise information such as the street, city, state, and zip code for a particular energy load control device 105 or a particular load asset 107. The desired topology data field 1418 can comprise parameters relevant to the desired topology 305 selected by the user. For example, if a geographic topology 305B was selected, then this topology data field 1418 can comprise the related nodes 303 that are relevant to the particular energy load control device 105 being evaluated.

The rate contract data 1421 can comprise information that generally correspond with the rate control contract parameters 187 illustrated in FIG. 6. For example, this field can comprise information such as seasons 603, in the days of the week 606. One of ordinary skill in the art will recognize that the listing of batch file data 1400 in FIG. 13B is not exhaustive. Other batch file data 1400 relevant for each energy load control device 105 could be included and would not depart from the scope of the invention.

Figure 14:
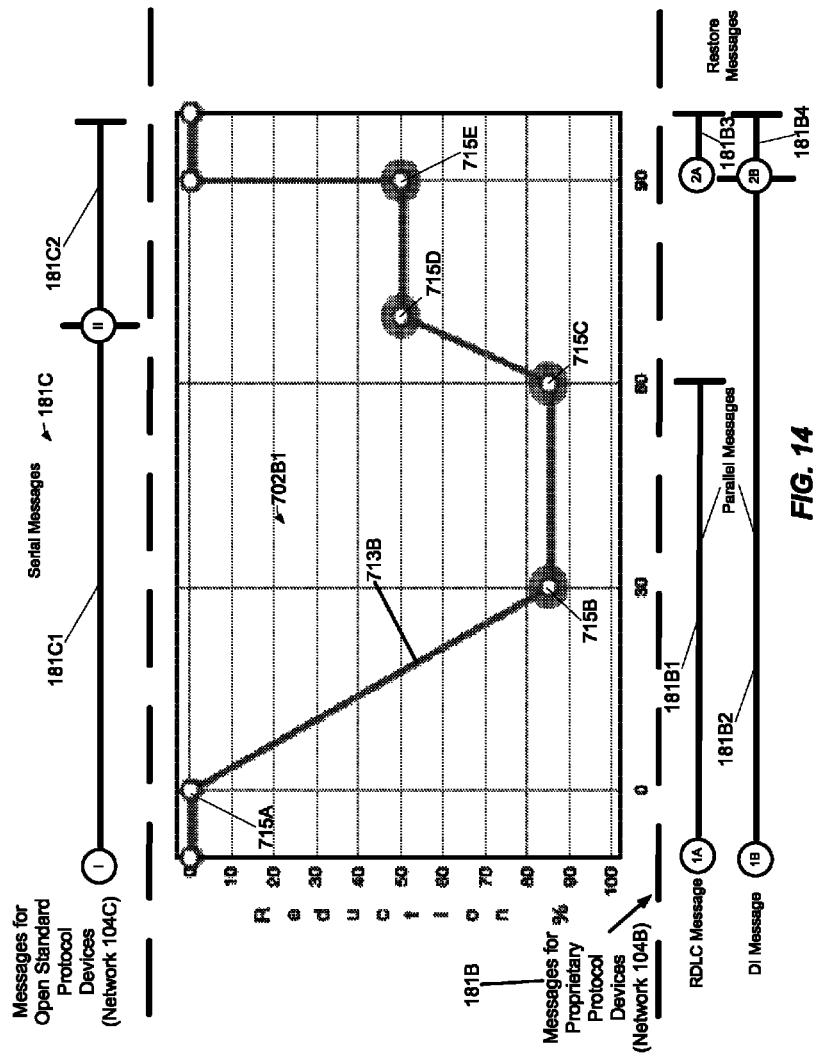
FIG. 14 illustrates how various messages are predetermined for a corresponding control strategy according to an exemplary embodiment of the invention.

FIG. 14 illustrates how various messages 1505 are predetermined or pre-calculated for a corresponding control strategy 702B1 according to an exemplary embodiment of the invention. The control strategy 702B1 of FIG. 14 is the same one as illustrated in FIG. 7. The control strategy 702B1 has an X-axis 710 and a Y-axis 707. The X-axis 710 can comprise increments of time while the Y-axis 707 can comprise rate reduction expressed in a percentage.

Above and below the energy control strategies 702B1 various types of exemplary messages 181 are displayed that can be sent to various energy load control devices 105 that can achieve the plot 713B of the selected control strategy 702B1. The first set of messages 181C can be those which are sent across the network 104C of FIG. 1 which may comprise a network based on an open standard communications protocol. In the exemplary embodiment illustrated in FIG. 14, the first set of messages 181C can comprise a first message 181C1 and a second message 181C2.

The first and second messages 181C1, 181C2 can be transmitted in a serial fashion or one after the other in order to achieve the control strategy 702B1 illustrated in the graph. According to one exemplary environment, the first set of messages 181C can be ones used in the open standard communications protocol governed by the Zigbee standard.

Figure 15:
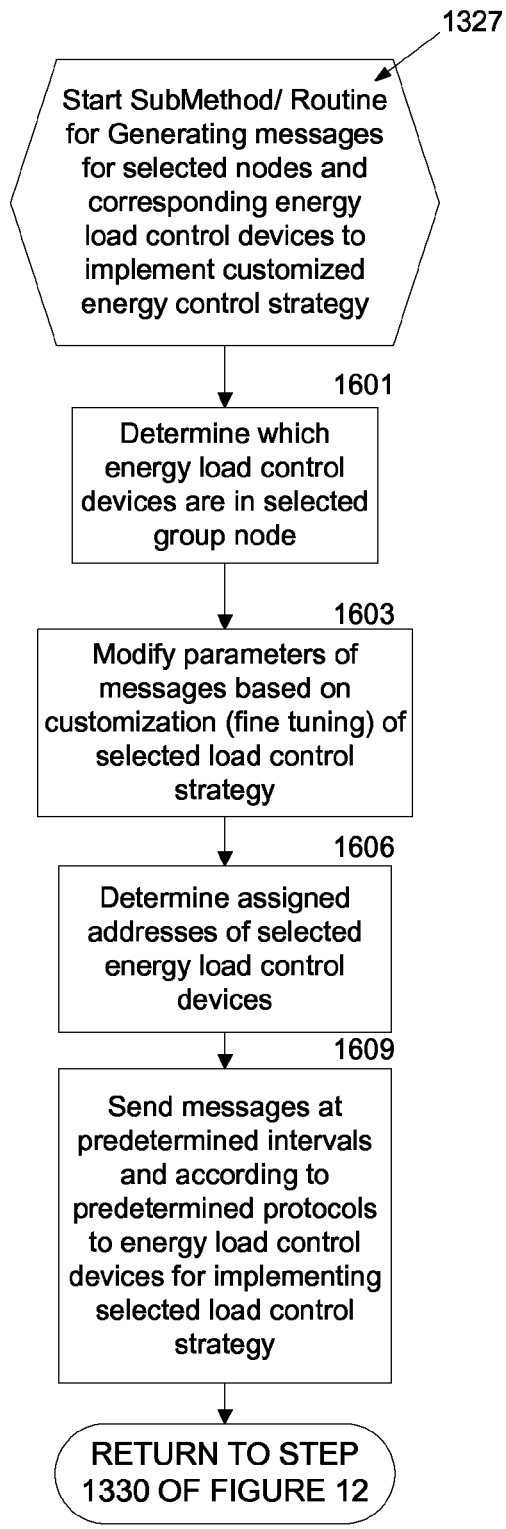
FIG. 15 is a logic flow diagram highlighting various steps of a sub-method or routine of FIG. 12 for generating messages for selected nodes and corresponding energy load control devices to implement a customized control strategy according to an exemplary embodiment of the invention.

The first message 181C1 can be a message that comprises an instruction for a 100% duty cycle with a random-in/random-out for a duration to and through the Plateau which terminates at the point 715D in FIG. 15. The second message 181C2 can be a message that comprises an instruction for a 50% duty cycle with no random-in/no random-out for a duration that is equivalent to the length of the Plateau which is between the points 715D and 715E.

These first and second messages 181C1 and 181C2 correspond with an control strategy 702B1 which has not received any customization from a user. If a user were to customize the control strategy 702B1, then the control strategy domain object 1139 of the central controller 102 would determine what type of adjustments or modifications would be needed for each message 181 to reach or achieve the customizations of the points 715 along the plot 713B. The control strategy domain object 1139 will automatically make these adjustments or modifications to the first and second messages 181C1 and 181C2 to the triggers program domain object 1130.

Meanwhile, a second set of messages 181B, different from the first set of messages 181C, are needed for those energy load control devices 105 that reside in the network 104B. The network 104B can comprise a proprietary communications protocol according to one exemplary embodiment of the invention. In the example illustrated in FIG. 14, this second set 181B of messages can used by an energy control device 105 that is currently sold by Comverge, Inc. of Georgia. The first message 181B1 can comprise a randomized direct load control (RDLC) message that has a duration through the trough of the plot 713B or to point 715C on the plot 713B.

The second message 181B2 can comprise a distributed intelligence message that has a duration through the end of the event which is point 715E of the plot 713B. The first and second messages 181B1, 181B2 must be transmitted in parallel or at the same time in order to achieve the desired shape of the selected control strategy 702B1. A third set of messages 181B3, 181B4 may be optionally transmitted in order to achieve the geometry of the control strategy 702B1 as illustrated in FIG. 15. This third set of messages 181B3, 181B4 can comprise two separate restore messages that can be transmitted by the triggers program domain object 1130 which is in communication with the control strategy program domain object 139.

The first and second set of messages 181C, 181B are assigned to the geometry of the template or control strategy 702B1 as illustrated in FIG. 14. The control strategy program domain object 1139 is responsible for determining and tracking any adjustments or changes that may be needed to the messages 181 that are assigned to a particular control strategy 702B1.

The first and second set of messages 181C, 181B are only examples of the types of messages 181 that can correspond with a selected control strategy 702. One of ordinary skill the art recognizes that each template or control strategy seven 702 may have a unique geometry or shape. The unique geometry and shape translates into different and unique messages 181 relative to the messages 181 illustrated in FIG. 14.

Other messages 181 which have not been described nor illustrated and which may be different from those illustrated and described in connection with FIG. 14 are included within the scope of the invention. While the messages 181 generally comprise control signals that are used to cause some action within an energy load control device 105 or a load asset 107, the messages 181 can also comprise information such as pricing signals for the rate notification system 110 for commercial and industrial assets 107 as illustrated in FIG. 1.

FIG. 15 is a logic flow diagram highlighting various steps of a sub-method or routine 1327 of FIG. 12 for generating messages 181 for selected nodes 303 and corresponding energy load control devices 105 to implement a customized control strategy 702B1 according to an exemplary embodiment of the invention. Step 1601 is the first step in routine 1327, in which the control strategy program domain object 1139 determines which energy load control devices 105 are in a selected group node 303 of a topology 305. In this step, the control strategy program domain object 1139 can communicate with the topology user interface domain object 160A to gather this data.

In step 1603, the control strategy program domain object 1139 can modify the parameters of predetermined messages 181 that were associated with a model or template control strategy 702. This modification to the messages 181 by the control strategy program domain object 1139 can be made in response to be customization or fine tuning of the points 715 of an control strategy plot 713B by a user, as illustrated in FIG. 8 described above.

In step 1606, the control strategy program domain object 1139 can determine the assigned addresses of the selected energy load control devices 105 or load assets 107. In this step, the control strategy program domain object 1139 can communicate with the transmitter program domain object 1109 to determine the addressing or routing for the messages 181 which need to be sent to the energy load control devices 105 and/or load assets 107 associated with the selected nodes three of three of the topology 305. Also in this step, the control strategy program domain object 139 can determine the changes to the duration and/or the start times which may be needed in response to the customization of the points 715 along a plot 7138 of a selected control strategy 702.

In step 1609, the control strategy program domain object 1139 working in conjunction with the transmitter program domain object 1109 and the triggers program domain object 1130 can send messages 181, such as those illustrated in FIG. 15, at predetermined intervals and according to predetermined communication protocols to the energy load control devices 105 and/or load assets 107 of selected nodes 303 for implementing a selected load control strategy 702. The routine 1327 then returns to step 1330 of FIG. 12.

Alternative embodiments for the method 1300 and system 101 for providing a central controller 102 that can communicate control messages 181 across different types of networks 104 to reach various energy load control devices 105 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention.

What is claimed is:

1. A computer method for communicating with energy load control devices across a heterogeneous network, comprising:
    displaying a relative position of energy load control devices within a topology for the heterogeneous network;
    displaying a list of energy load control strategies available for one or more energy load control devices of the heterogeneous network, the heterogeneous network comprising a first energy load control device in a first network and a second energy load control device in a second network, the first energy load control device has a first communications protocol and the second energy load control device has a second communications protocol, the second communications protocol being different relative to the first communications protocol; each energy load control strategy comprising a graph of rate reduction against time;
    receiving a selection of an energy load control strategy;
    receiving spatial changes to one or more points of a graph of rate reduction against time that is part of the selected energy load control strategy; each point being selectable and repositionable with a screen pointer within the graph and defining a portion of an energy control line, the rate reduction defining a y-axis that has units in percentage or energy, while an x-axis of the graph has units of time;
    generating one or more messages that correspond with the selected energy load control strategy and which are based on characteristics of the energy load control device, wherein at least one or more messages define a variable duty cycle having a predetermined duration, configured for simultaneous transmission and correspond to at least one spatial point of the graph; and sending the one or more messages to the energy load control devices across the heterogeneous network in order to implement the selected energy load control strategy at each load control device.

2. The computer method of claim 1, wherein each graph of an energy load control profile strategy comprises a plot of rate reduction measured along a Y-axis against time measured along an X-axis.

3. The computer method of claim 1, further comprising determining a geocode for an energy load control device.

4. The computer method of claim 3, wherein determining the geocode comprises assigning coordinates to the energy load control device based on latitude and longitude of the energy load control device.

5. The computer method of claim 1, further comprising displaying a topology comprising one or more nodes and corresponding to the energy load control device.

6. The computer method of claim 1, further comprising identifying a relative position of a second energy load control device within the topology and that is part of a second network.

7. The computer method of claim 1, wherein the energy load control device comprises at least one of a thermostat, digital controller unit (DCU), and a gateway.

8. A computer method for communicating with energy load control devices residing in one or more networks of a heterogeneous network, comprising:

storing a relative position of each energy load control device of a plurality of energy load control devices within a topology of the heterogeneous network and based upon a corresponding network in which each energy load control device resides;

displaying nodes within the topology of the heterogeneous network that comprise the energy load control devices which reside in the one or more networks;

receiving a selection of nodes within the topology;

displaying a list of energy load control strategies available for the selected nodes across the heterogeneous network, the heterogeneous network comprising a first energy load control device in a first network and a second energy load control device in a second network, the first energy load control device has a first communications protocol and the second energy load control device has a second communications protocol, the second communications protocol being different relative to the first communications protocol; each energy load control strategy comprising a graph of rate reduction against time;

receiving spatial changes to one or more points of a graph of rate reduction against time that is part of an energy load control strategy, each point being selectable and repositionable with a screen pointer within the graph and defining a portion of an energy control line, the rate reduction defining a y-axis that has units in percentage or energy, while an x-axis of the graph of rate reduction has units of time;

generating one or more messages that correspond with the selected energy load control strategy and which are based on characteristics of the energy load control device, wherein at least one or more messages define a variable duty cycle having a predetermined duration, configured for simultaneous transmission and correspond to at least one spatial point of the graph; and sending the one or more messages to the energy load control devices across the heterogeneous network in order to execute a load control strategy at each load control device.

9. The computer method of claim 8, further comprising displaying relative locations of the selected nodes on a geographic map.

10. The computer method of claim 8, further comprising receiving a selection of an energy load control strategy.

11. The computer method of claim 8, wherein the messages that correspond with a selected energy load control strategy and which are based on characteristics of the energy load control devices which are part of the selected nodes.

12. A computer system for communicating with energy load control devices residing in one or more networks of a heterogeneous network, comprising:

a processing unit;

a memory storage device;

a display device coupled to the processing unit for displaying data; and a program module for providing instructions to the processing unit, the processing unit responsive to the instructions of the program module, operable for:

displaying nodes within a topology for the heterogeneous network that comprise the energy load control devices;

displaying relative locations of the selected nodes on a geographic map;

receiving a selection of nodes within the topology;

displaying a list of energy load control strategies available for the selected nodes that comprise energy load control devices of the heterogeneous network, the heterogeneous network comprising a first energy load control device in a first network and a second energy load control device in a second network, the first energy load control device has a first communications protocol and the second energy load control device has a second communications protocol, the second communications protocol being different relative to the first communications protocol; each energy load control strategy comprising a graph of rate reduction against time;

receiving a selection of an energy load control strategy for the selected nodes;

receiving spatial changes to one or more points of a graph of rate reduction against time that is part of the selected energy load control strategy, each point being selectable and repositionable with a screen pointer within the graph and defining a portion of an energy control line, the rate reduction defining a y-axis that has units in percentage or energy, while an x-axis of the graph of rate reduction has units of time; and generating one or more messages that correspond with the selected energy load control strategy and which are based on characteristics of the energy load control devices that are part of the heterogeneous network, wherein at least one or more messages define a variable duty cycle having a predetermined duration, configured for simultaneous transmission and correspond to at least one spatial point of the graph.

13. The system of claim 12, wherein the processing unit is further operable for sending the one or more messages to the energy load control devices of the selected nodes across the heterogeneous network in order to implement the selected energy load control strategy.

14. The system of claim 12, further comprising a notification system that is used to communicate with at least one of an industrial and a commercial type load asset while the energy load control units are coupled to residential type load assets.

15. A computer system for communicating with energy load control devices residing in one or more networks across a heterogeneous network, comprising:
- a processing unit;
- a memory storage device;
- a display device coupled to the processing unit for displaying data; and
- a program module for providing instructions to the processing unit, the processing unit responsive to the instructions of the program module, operable for:
  - storing a relative position of each energy load control device of a plurality of energy load control devices within a topology and based upon a corresponding network in which each energy load control device resides;
  - displaying nodes within the topology of the heterogeneous network that comprise the energy load control devices which reside in the one or more networks;
  - receiving a selection of nodes within the topology;
  - displaying a list of energy load control strategies available for the selected nodes that comprise the energy load control devices of the heterogeneous network, the heterogeneous network comprising a first energy load control device in a first network and a second energy load control device in a second network, the first energy load control device has a first communications protocol and the second energy load control device has a second communications protocol, the second communications protocol being different relative to the first communications protocol; each energy load control strategy comprising a graph of rate reduction against time;
  - receiving a selection of an energy load control strategy;
  - receiving spatial changes to one or more points of a graph of rate reduction against time that is part of the selected energy load control strategy, each point being selectable and repositionable with a screen pointer within the graph and defining a portion of an energy control line, the rate reduction defining a y-axis that has units in percentage or energy, while an x-axis of the graph of rate reduction has units of time;
  - generating one or more messages that correspond with the selected energy load control strategy and which are based on characteristics of the energy load control device, wherein at least one or more messages define a variable duty cycle having a predetermined duration, configured for simultaneous transmission and correspond to at least one spatial point of the graph; and
  - sending the one or more messages to the energy load control devices across the heterogeneous network in order to implement the selected energy load control strategy at each load control device.

16. The system of claim 15, wherein the processing unit is further operable for displaying relative locations of the selected nodes on a geographic map.

17. The computer system of claim 12, wherein the program module is further operable for determining a geocode for an energy load control device.

18. The computer system of claim 17, wherein determining the geocode comprises assigning coordinates to the energy load control device based on latitude and longitude of the energy load control device.

19. The computer system of claim 15, wherein the program module is further operable for determining a geocode for an energy load control device.

20. The computer system of claim 19, wherein determining the geocode comprises assigning coordinates to the energy load control device based on latitude and longitude of the energy load control device.

21. The computer method of claim 8, wherein each energy load control device comprises at least one of a thermostat, digital controller unit (DCU), and a gateway.

22. The computer system of claim 12, wherein each energy load control device comprises at least one of a thermostat, digital controller unit (DCU), and a gateway.

23. The computer system of claim 15, wherein each energy load control device comprises at least one of a thermostat, digital controller unit (DCU), and a gateway.

* * * * *